(12) United States Patent
Terrell et al.

(10) Patent No.: US 10,611,649 B2
(45) Date of Patent: *Apr. 7, 2020

(54) SKIMMER AND OIL WATER SEPARATOR PROCESS

(71) Applicant: EXACTRATION, LLC, Shepherdsville, KY (US)

(72) Inventors: Brent D. Terrell, Bardstown, KY (US); Howard Scott Stockton, Brooks, KY (US)

(73) Assignee: Exactration, LLC, Shepherdsville, KY (US)

( * ) Notice: Subject to any disclaimer, the term of this patent is extended or adjusted under 35 U.S.C. 154(b) by 71 days.

This patent is subject to a terminal disclaimer.

(21) Appl. No.: 15/530,141

(22) Filed: Dec. 6, 2016

(65) Prior Publication Data

US 2018/0155216 A1    Jun. 7, 2018

(51) Int. Cl.
| | | |
|---|---|---|
| *C02F 1/40* | (2006.01) | |
| *B01D 17/02* | (2006.01) | |
| *B01D 15/02* | (2006.01) | |
| *B01D 17/12* | (2006.01) | |
| *E02B 15/10* | (2006.01) | |
| *C02F 1/28* | (2006.01) | |
| *C02F 1/00* | (2006.01) | |
| *C02F 101/20* | (2006.01) | |

(52) U.S. Cl.
CPC .............. *C02F 1/40* (2013.01); *B01D 15/02* (2013.01); *B01D 17/0202* (2013.01); *B01D 17/0211* (2013.01); *B01D 17/0214* (2013.01); *B01D 17/12* (2013.01); *E02B 15/106* (2013.01); *C02F 1/283* (2013.01); *C02F 2001/007* (2013.01); *C02F 2101/20* (2013.01); *C02F 2301/022* (2013.01)

(58) Field of Classification Search
CPC ... B01D 17/0211; B01D 17/0214; C02F 1/40; E02B 15/10; E02B 15/106; E04H 4/1272
USPC .......... 210/122, 242.1, 242.3, 521, 540, 776
See application file for complete search history.

(56) References Cited

U.S. PATENT DOCUMENTS

| | | | | |
|---|---|---|---|---|
| 2,330,508 A | * | 9/1943 | McColl ................. | E02B 15/106 210/242.3 |
| 3,830,370 A | * | 8/1974 | Glaeser ................. | E02B 15/106 210/242.3 |
| 3,853,753 A | | 12/1974 | Jones | |
| 4,011,158 A | | 3/1977 | Cook | |
| 4,024,063 A | * | 5/1977 | Mori ....................... | E02B 15/10 210/242.1 |

(Continued)

*Primary Examiner* — Christopher Upton
(74) *Attorney, Agent, or Firm* — Carrithers Law Office PLLC; David W. Carrithers

(57) ABSTRACT

A skimmer for removing a layer of oil floating on a surface oil contaminated water which subsequently concentrated and separated in an oil water separator which removes tramp oils or other fluids, such as hydraulic oils, with specific gravity less than that of the operating fluid are required to be removed from operating fluid such as water, lubri-coolants or other liquids. The skimmer supplies concentrated oil water composite fluid to a separator apparatus designed for use in industrial applications in which unwanted tramp oils or other fluids, such as hydraulic oils, with specific gravity less than that of the operating fluid are required to be removed from operating fluid such as water, lubri-coolants or other liquids.

13 Claims, 14 Drawing Sheets

(56) References Cited

U.S. PATENT DOCUMENTS

| | | | |
|---|---|---|---|
| 4,145,280 A | | 3/1979 | Middelbeek et al. |
| 4,191,651 A | | 3/1980 | Cheysson |
| 4,406,791 A | | 9/1983 | Khapaev |
| 4,447,322 A | | 5/1984 | Zajdlik |
| 4,878,924 A | | 11/1989 | Yano et al. |
| 4,980,070 A | * | 12/1990 | Lieberman ......... B01D 17/0214 210/800 |
| 5,118,412 A | * | 6/1992 | Schmidt ............... E02B 15/106 210/122 |
| 5,236,585 A | * | 8/1993 | Fink ................... B01D 17/0214 210/242.3 |
| 5,300,222 A | | 4/1994 | Broussard |
| 5,378,376 A | * | 1/1995 | Zenner .................. B01D 21/22 210/776 |
| 5,456,842 A | | 10/1995 | Kibblehouse et al. |
| 5,603,825 A | | 2/1997 | Costinel |
| 6,056,128 A | | 5/2000 | Glasgow |
| 6,238,577 B1 | * | 5/2001 | MacLaren .......... B01D 21/0042 210/242.1 |
| 6,251,266 B1 | * | 6/2001 | Gannon ............. B01D 17/0214 210/122 |
| 6,613,233 B1 | | 9/2003 | Rusk et al. |
| 7,156,241 B2 | | 1/2007 | Hanks |
| 7,157,007 B2 | | 1/2007 | Frankiewicz et al. |
| 7,364,663 B2 | | 4/2008 | Larson |
| 7,708,681 B2 | | 5/2010 | Bartosek et al. |
| 8,220,551 B2 | | 7/2012 | Fenton |
| 9,707,494 B2 | * | 7/2017 | Terrell ............... B01D 17/0214 |
| 2008/0190834 A1 | * | 8/2008 | Urquhart ............ B01D 21/0012 210/242.1 |
| 2009/0139921 A1 | | 6/2009 | Bartosek et al. |
| 2012/0255900 A1 | | 10/2012 | Osawa et al. |

\* cited by examiner

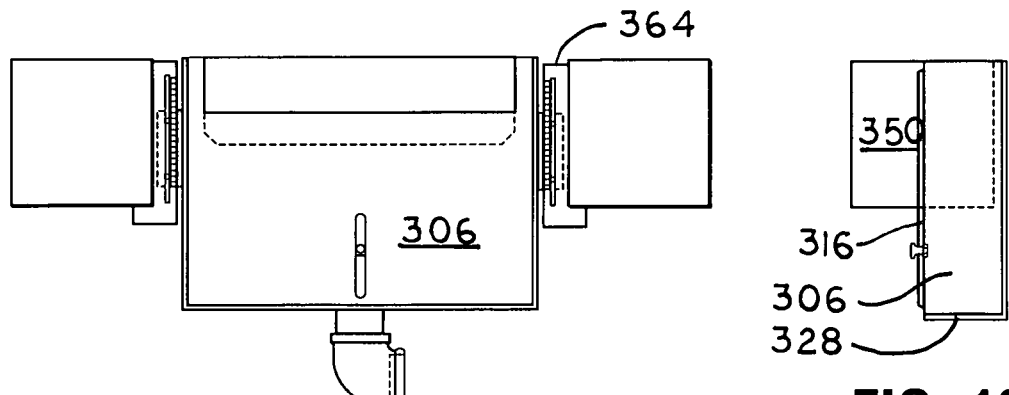
FIG. 17
FIG. 19
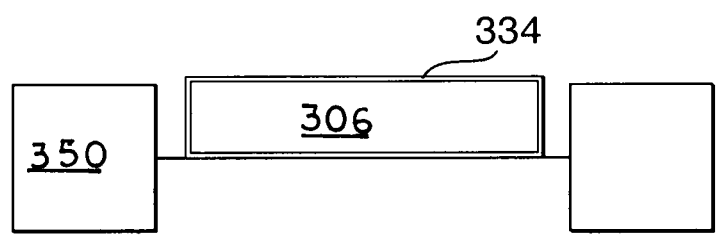
FIG. 18
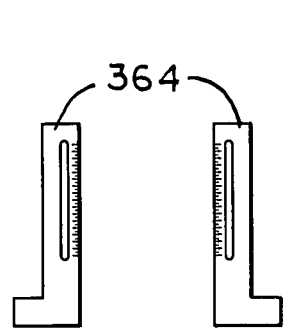
FIG. 20
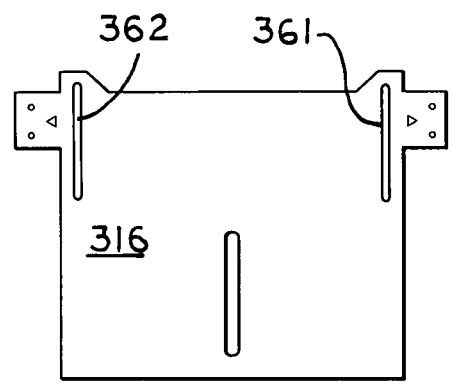
FIG. 21

SKIMMER AND OIL WATER SEPARATOR PROCESS

CROSS REFERENCES TO RELATED APPLICATIONS

This application is a Continuation-In-Part of U.S. application Ser. No. 15/530,132 filed on Dec. 5, 2016 which claims priority from U.S. Provisional Application Ser. No. 62/386,495 filed on Dec. 3, 2015 both of which are incorporated by reference herein in its entirety.

TECHNICAL FIELD

The present invention relates to skimmer devices for removing oil floating on the surface of an oil/water composite fluid for further processing in an oil/water separator.

BACKGROUND OF THE INVENTION

Oil-water mixtures resulting from industrial activities has produced serious pollution problems when discharged into the environment and even for facilities with wastewater treatment systems, the discharge of large volumes of oily waste water is an expensive and difficult treatment burden.

Machine parts or heat treated parts are often washed in parts washing tanks, and the washing solution is contaminated with manufacturing oils and heat treating quench oil and it is necessary to haul the oil-contaminated wash water away to disposal sites or for further separation treatment.

Furthermore, the separation of mixtures of oil and water include economic considerations, and work place safety and health. Contamination in the parts washing solutions and/or cutting, grinding, and metal processing operations contribute to an inefficient cleaning process which typically requires secondary cleaning and manufacturing steps to correct. The treatment and/or separation of fluids results in an added expense and time requirement to the manufacturing process.

Several types of treatment methods and systems have been developed in efforts to efficiently separate oil from water-oil mixtures. One treatment method is filtration, by which oil is entrapped by a filter and may be accomplished by conventional methods such as by barrier filters having bag and cartridge filters, or by membrane filters which are designed to remove emulsified oil from water. These types of filters tend to clog quickly, and are time consuming and expensive to replace.

Coalescers in horizontal separators is another conventional means to separate fluids. Coalescers are generally tightly packed beds of coalescing media or closely spaced plates, which aid in the separation of oil from water. Typical coalescer configurations are stacks of closely spaced plates, angled from vertical to horizontal. The plates may also be grooved or channeled, or wavy. Under the influence of gravity, oil separates from an oil/water mixture at a rate determined by Stokes law which predicts how fast an object will rise or fall through a heavier fluid based on the density and size of the object and the distance it must travel. In a packed media bed coalescer fluids are exposed to large amounts of surface area provided by the coalescing media. For instance, as an oil-water mixture passes through this media, oil droplets are temporarily held by the coalescing media where they are exposed to further contact with oil molecules in the mixture. This physical contact on the surface of the coalescer media has the effect of increasing or coalescing the size of the oil droplets in the mixture. In closely spaced plate and corrugated coalescing separators oil rises only a short distance where it is captured on the underside of the coalescing plates. The use of coalescers can improve the performance of horizontal separators; however, the coalescers are very susceptible to clogging in some separation processes.

Vertical separators generally involve discharge of an oil-water mixture into a vertical conduit, which is generally open at the bottom of a container such as a collecting tank. The mixture is discharged near either the upper end or the lower end of the tube and as the mixture flows into the tube, the oil rises and the water sinks, effecting separation of the two different fluids. The cleaner water is discharged from the bottom of the tube into the surrounding water, whereas the oil collects at the top of the tube. The oil may be collected be means of a tube and a pump, or it may be discharged by means of an overflow tube.

SUMMARY OF THE INVENTION

A skimmer removes a layer of oil floating on a surface oil contaminated water which subsequently concentrated and separated in an oil water separator which removes tramp oils or other fluids, such as hydraulic oils, with specific gravity less than that of the operating fluid are required to be removed from operating fluid such as water, lubri-coolants or other liquids. The skimmer supplies concentrated oil water composite fluid to a separator apparatus designed for use in industrial applications in which unwanted tramp oils or other fluids, such as hydraulic oils, with specific gravity less than that of the operating fluid are required to be removed from operating fluid such as water, lubri-coolants or other liquids.

The skimmer for an oil water separator of the present invention includes a stationary receiver box having a bottom connecting to side panels and front and bottom panels supported by brackets which are affixed to the inside of a tank which is filled with water and oil contaminants. The front panel of the receiver box includes a central longitudinal slot extending vertically along the bottom portion thereof.

A slidable weir plate including a central longitudinal slot on the lower portion is slideably received within the stationary receiver box and slidably held in an aligned selected position with respect to the slot of the stationary receiver box and held in position by a single bolt allowing the plate "play" or limited movement to eliminate binding of the plate within the receiver box when movement of the liquid therein causes movement of floats held by the slidable weir plate. The top portion of the slidable weir plate includes a slightly lower cutaway portion comprising a weir for removal of oil floating on the surface of a fluid in fluid communication with the stationary receiver box. A pair of generally rectangular floats are removably and adjustably attached by longitudinal vertical flanges extending from the inner sides to cooperatively and slidably engage side plate side tabs extending outward laterally from the upper portion of the slidable weir plate. Float flanges and/or slide plate tabs include indicia to enable the floats to be adjusted with respect to the slide plate in order to optimize the skimming capability of the skimmer by adjusting the position of the slide plate weir with respect to the oil floating on the surface of the contaminated fluid and the level of water in the tank and stationary reservoir. Moreover, the attachment of the slide plate by a single bolt or pin allows the plate to pivot slightly and minimize binding caused by waves of fluid motion against the floats which tend to cause the weir plate to cock and get in a bind. A point of novelty lies in using a single attachment point allowing some pivotaiton of the skimmer weir reducing friction on the weir plate and minimizing binding of the weir plate against the receiver box.

The composite fluid oil water separator is capable of isolating a first liquid from a composite fluid having a first and second liquid, in which the first and second liquid has differing specific gravities. The composite fluid oil water separator can be used primarily to remove tramp oils from cutting & cleaning fluids. The present invention includes features such as the rotating plastic (or composite) drum for mechanical removal, the automatic adjustable overflow tube for raising the liquid level during the purge cycle for purging secondary (remaining) oil that gets past the drum, and a water conveyor which is very good a moving the oil to the drum for removal. Additionally, the present invention can be used for the separation of particulate from fluids in any setting.

Oil water separators depend upon the use of gravity to separate a mixture of oil and water. Gravity separation exploits the difference in specific gravity between oil and water. Conventional gravity separators known in the art often consists of a large holding tank, in which oil rises to the surface of the water. The tanks must be substantially turbulent free to operate, and require an additional means to remove the oil. The tanks are filled and as the oil collects at the surface it is removed and the water returned for reuse or discharged. These tanks are slow, and require very large surface areas. In horizontal gravity separators, water enters at one side of a horizontal tank, and as it flows to the other side, the oil rises to the surface, where it can be collected. The cleaner water is then discharged from another side of the tank. The oil is typically collected by means of baffles which hold the oil-water interface below the top of the baffle; the floating oil which accumulates above the interface then spills over the top and into a separate compartment from which it can be collected and discharged.

It is an object of the present skimmer invention to provide a skimmer for separating and concentrating oil from a water mixture based upon the specific gravity of the lighter fluid floating on the denser and heavier fluid whereby the concentrated oil containing water contaminants is further processed in an oil water separator apparatus which can be of a minimum size for concentrating the oil based on a smaller throughput volume as compared to the oil and water fluid prior to being processed with the skimmer.

It is another object of the present skimmer invention to provide for attachment of the slide plate by a single bolt or pin allows the plate to pivot slightly and minimize binding caused by waves of fluid motion against the floats which tend to cause the weir plate to cock and get in a bind and use of a single attachment point allows some pivotaiton of the skimmer weir reducing friction on the weir plate and minimizing binding of the weir plate against the receiver box.

It is an object of the present invention to remove oil at 2 gallons/hour when operating a 10 gallons/minute flow rate through the unit. The unit/design is scalable to accommodate many various throughputs (inlet flow rates) and outputs (oil removal rates).

It is an object of the present invention to provide a composite fluid oil water separator for removing targeted constituencies from fluid streams based upon the different densities of the fluids.

It is another object of the present invention to provide an oil-water separator which has low maintenance and easy to operate and can be operated in-line as in an industrial setting.

It is another object of the present invention to remove tramp oils from cutting and cleaning fluids.

It is another object of the present invention to utilize a rotating drum comprised of a material which has an attractive affinity for oil and is removable.

It is another object of the present invention to utilize a rotating drum which may be covered or coated with a substance which has an affinity for a selected liquid or a suspended solid particulate matter which enhances the adhesion of the liquid or suspended solid particulate matter thereto.

It is another object of the present invention to provide a removable rotating drum including magnet means for adhering macro and microscopic magnetic metal particles.

It is another object of the present invention to provide rotating drum means for application of charged coatings or surfaces for attracting particular substrates thereto.

It is another object of the present invention to provide means for purging secondary (remaining) oil or other separated component that gets pass the rotating drum via an automatic, electric or air actuated adjustable overflow tube or weir to raise the liquid level for purging.

It is another object of the present invention to utilize a liquid conveyor (such as a water conveyor) to move the separatable component (such as oil) within contact with the rotatable drum.

It is another object of the present invention to provide an oil-water separator which has a small footprint and is easy to install.

It is another object of the present invention to capture unwanted oils in solution and mechanically removes from liquid.

It is another object of the present invention to include a second stage purge cycle to eliminate accumulated, residual oils.

It is another object of the present invention to reduces disposal costs by removing oil from oil laden solutions.

It is another object of the present invention to increase the performance and life cycle costs of equipment.

It is another object of the present invention to utilize an oil water separation apparatus which provides low operating costs (5 scfm Compressed Air, ½ HP Single Phase Motor).

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein:

FIG. 17 is a front view of the skimmer showing the floats, stationary receiver box and adjustable skimmer weir plate;

FIG. 18 is a top view of FIG. 17;

FIG. 19 is a right side view of FIG. 19;

FIG. 20 is a front view of the skimmer floats attachment brackets showing the depth indicia as a vertical scale of hash marks formed, marked, or applied as a tape to the movable vertical inner sides of the brackets holding the floats to the skimmer;

FIG. 21 is a front view of the adjustable skimmer weir plate;

DESCRIPTION OF THE PREFERRED EMBODIMENTS

Figure 1:
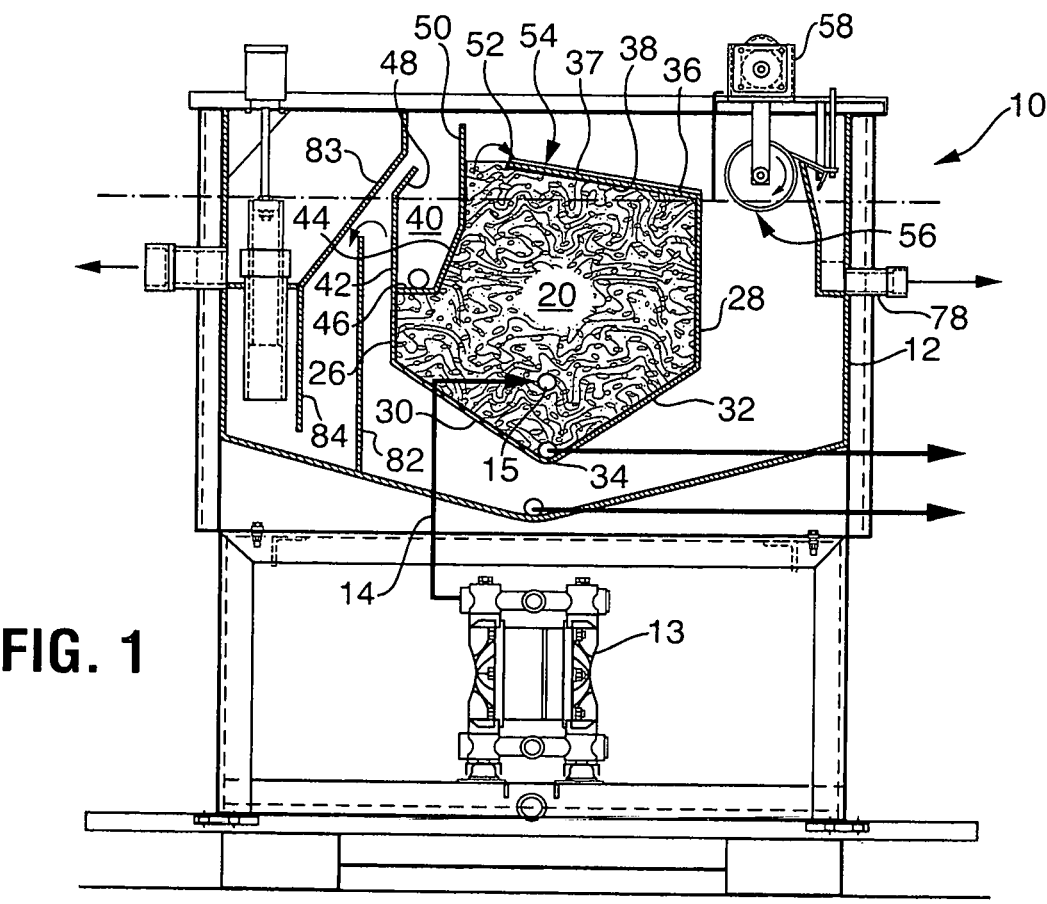
FIG. 1 shows the Quiescent/Coalescent inner chamber which receives oily solution inlet from process.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the term "about" can be reasonably appreciated by a person skilled in the art to denote somewhat above or somewhat below the stated numerical value, to within a range of ±10%.

For purposes of discussion, the composite fluid separator will comprise an oil and water solution wherein oil is the contaminate which is removed from the water. Of course it is contemplated that any fluids having densities or specific gravities lighter than that of water or primary solution can be removed.

The oil water fluid separator unit is designed to be used in industrial applications in which unwanted tramp oils or other fluids, such as hydraulic oils, with specific gravity less than that of the operating fluid are required to be removed from operating fluid such as water, lubri-coolants, oils, or other liquids having different densities are separated one from another comprising, consisting essentially and or consisting of the apparatus and process steps described hereafter.

As shown in FIG. 1, the present invention comprises or consists of a water tight main tank 12 including a primary quiescent/coalescent chamber 20, a liquid conveyor 54, a rotating drum 56 and gear motor assembly, drum wiper, mechanical oil separation chamber, secondary quiescent/coalescent chamber, purge oil chamber, purge oil baffle, concentrated product chamber 64, and clean fluid chamber.

The processing of the liquid containing the highest concentration of material to be separated is transferred by a pump 13 through line 14 and port 15 into the quiescent/coalescent inner chamber 20 which is centrally disposed within the main tank 12. The quiescent/coalescent chamber comprises a generally pentagon shaped tank including pentagon side walls 22, 24, a first end wall 26, and second end wall 28 connecting to a pair of inclined bottom panels 30, 32 which converge at an obtuse angle forming a drain 34 at the convergence thereof. A cover 36 having a top surface 37 and bottom surface 38 extends from the second end wall 28 a selected distance toward the first end wall 26 and extends upward at a selected obtuse angle of up to 50 degrees, more preferably from 1 to 30 degrees, more preferably from 5-20 degrees, more preferably from 7 to 15 degrees and most preferably about 10 degrees from a horizontal position forming a gradual inclined plane. A purge oil chamber 40 defining a deep vessel with narrow walls is formed within the chamber 20 wherein a top end wall portion 42 of the first end wall 26 connects to an inner purge oil chamber wall 44 by a bottom wall portion 46, all of which connect to the pentagon side walls 22, 24. A first purge oil baffle 48 projects inwardly from the end wall portion 42 at an angle of from 25 to 75 degrees and more preferably at an angle of about 45-55 degrees and most preferably an angle of about 50 degrees. A second vertical baffle 50 extends upward from the inner purge oil chamber wall 44 a distance greater than that of said first purge oil baffle 48 and said second end wall 28.

Stage 1—Quiescent/Coalescing Process

In stage 1 of the separation process, the quiescent/coalescent chamber 20 receives oily (oil/water) solution transferred through line 14 from pump 13 into inlet 15. This chamber 20 is liquid tight and is filled to a selected level so that an overflow of oil/water level occurs and the oil/water solution spills over the top surface 37 of the cover 36 wherein the top edge 52 functions as a weir and the top surface 37 of the cover 36 functions as a means of conveying the liquid mixture or as a "liquid conveyor" 54. Controlling flow rate and the level of the oil/water solution in the chamber 20 creates a slow moving laminar flow passing over the liquid conveyor whereby the chamber 20 maintains a higher fluid level than any other compartment within the unit 10. The oily solution is forced up to the water conveyor area and overflows down to a rotating drum 56.

Stage 2—Fluid Conveyor—

Figure 2:
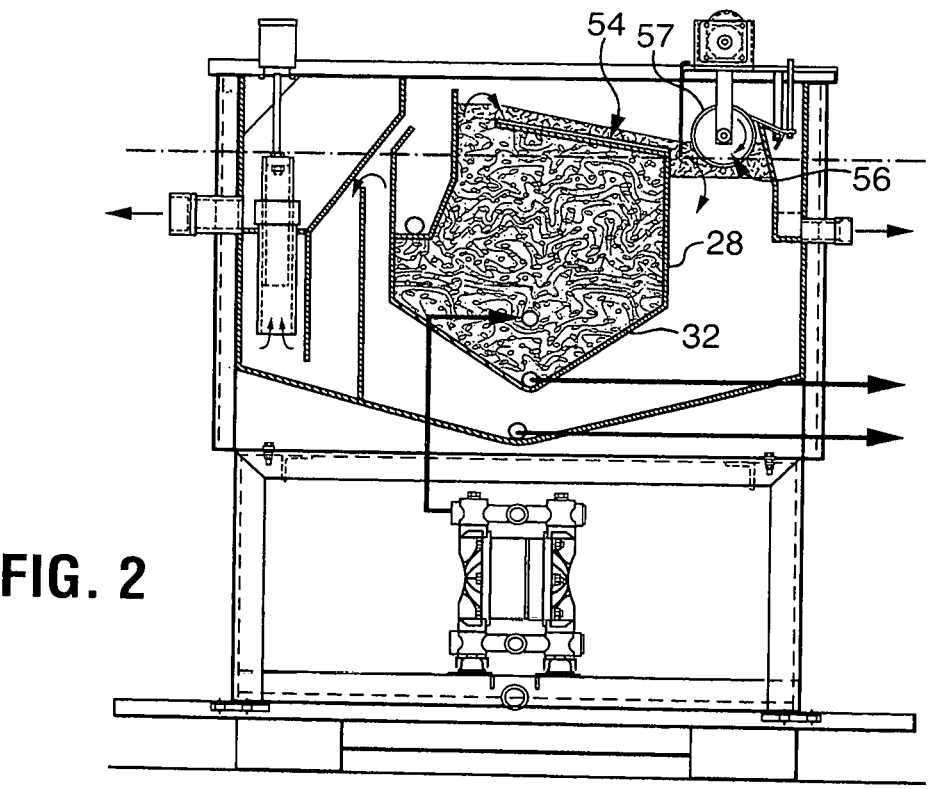
FIG. 2 shows the Water Conveyor wherein the oily solution is carried to the rotating drum for removal of tramp oil.

The fluid conveyor process is best illustrated in FIG. 2, which shows the oil/water liquid overflowing the chamber 20 and flowing down the water conveyor 54. The oily solution is carried to the rotating drum 56 for removal of tramp oil or other liquid having a density or other physical or chemical characteristic which can be utilized to create an affinity for the separable component to stick or adhere to the surface of the rotating drum. As shown, a thin layer of solution overflows the liquid conveyor weir 54 wherein the oil having less density than water tends to float to the surface of the laminar flow which carries the tramp oil to the rotating drum 56. The tramp oil floats to the surface and the "water conveyor", liquid conveyor 54 continually pushes (or conveys) the oil to the rotating drum for removal. The liquid conveyor 54 can as an option include an irregular surface with ridges, bumps, dimples or grooves on the entire surface or portions thereof to enhance the • liquid component separation.

Stage 3—Mechanical Oil Separation—

The oil separation process regards the steps of separation of the fluids, (oil and water) from the oily solution by mechanical means. This section is where the lighter density fluids such as floating tramp oils are mechanically removed from the solution. The rotating drum surface is constructed from metal (copper, steel, stainless steel, aluminum, or combinations thereof) and/or plastic material (a polyethylene, a polypropylene, a nylon, a rubber, a silicon material, an elastomer, a polyvinylchloride, ABS, or other plastic materials depending upon the physical and chemical properties of the fluids to be separated such as the tramp oil/water chemical properties. Most oils have an affinity for certain types of plastics. This is a point of novelty with regard to the overall design of the unit because it allows for uses of various drum materials depending upon the chemical properties of the fluids to enhance adhesion of a selected one of the fluids to the drum. It is anticipated that more than one drum can be utilized in a series in fluid communication with the fluid conveyor as shown in FIGS. 1-16 wherein a fluid containing three separatable components would contact a first drum having a component removed therefrom and the remaining fluid would flow along a fluid conveyor at least one other drum where a second component would adhere to a drum having a surface comprising a material having an affinity for another second component which would adhere thereto and be removable from the rotating drum leaving the remaining fluid flowing along the fluid conveyor to be collected for further processing or storage. Moreover, the rotating drums could be coated with a chelating substance to remove chemical toxins, heavy metals, or other chemical contaminants. The drum surface or removable sleeve 57 covering the drum may comprise a film, or metal or plastic material, comprising an impervious material or porous and be inert or covered with a carbon material for absorption of odoriferous contaminants. Moreover, the drum surface or sleeve material could comprise a micro porous substance wherein a selected portion of the liquid could pass through the rotating drum and siphoned off to a collection vessel. The drum surface and/or sleeve could also utilize surface irregularities, either macro or microscopic in size to aid in adsorption of materials. Furthermore, it is anticipated that the rotating drum may be heated by steam of hot liquid such as water or oil or cooled by a liquid such as water, water/alcohol, water/glycol, or gas to facilitate the adhesion • or absorption capabilities of the rotating drum features. Moreover, the rotating drum surface or sleeve can be comprised of a material having an electric potential and carry an ionic charge attractive to selected substrates.

The rotating drum 56 is powered by a variable speed electric motor 58 which rotates the drum at an optimal selected speed based on the maximum efficiency for adherence or adsorption/absorption of the lighter density material to the drum. For example, in the process of removing tramp oil from an oil solution such as water, the drum rotates at approximately 7 RPM using a low voltage gear motor. The gear motor also includes a speed controller such that the drum rotation can be increased or, for example removing tramp oil from water, slowed to 1 RPM (or less) depending upon the need. The drum and gear motor assembly is modular in that it can be easily removed for repair. This assembly also incorporates vertical adjustment to control the immersion depth of the drum 56 in solution.

Figure 3:
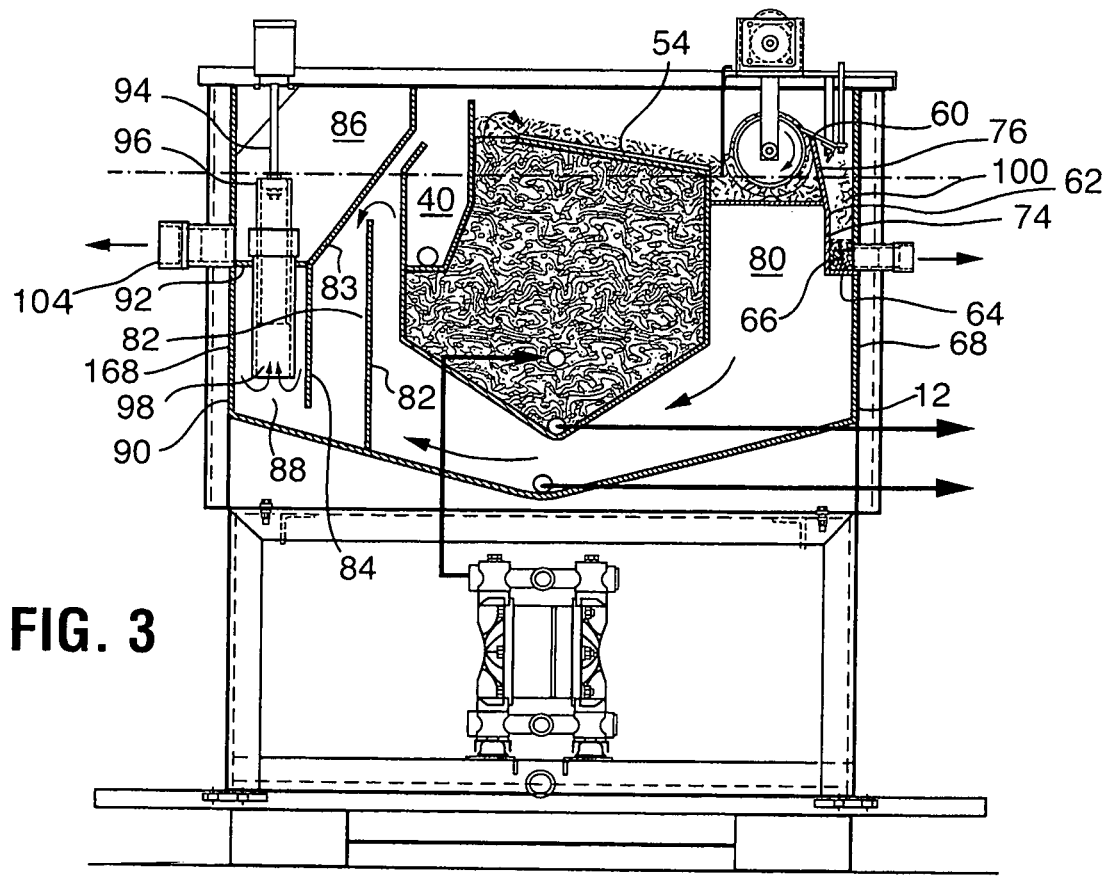
FIG. 3 shows the Mechanical Oil Separation wherein the floating tramps oils are mechanically removed from the solution.

As shown in FIGS. 2-6, the lighter density fluid component, for example, the tramp oil or concentrated fluid product 100 adheres to the clockwise rotating drum and is removed by a wiper 60 comprising a blade of metal or plastic material which extends across at least a portion of the rotating drum and cooperatively engages the rotating drum 56 surface or sleeve 57 surface and may touch or be spaced apart therefrom a selected distance depending upon the physical and chemical properties of the concentrated fluid product 100 sufficient to remove all or most of the concentrated product. The wiper 60 as shown in FIG. 3 is spaced apart from the rotating drum. The wiper 60 is supported by a baffle which forms and inner baffle end wall 62 to a concentrated product chamber 64 which includes a bottom wall 66 connecting to a first tank end wall 68 of the main tank 12. The baffle end wall 62, bottom wall 66 and a first tank end wall 68 connect to the first tank side wall 70 and second tank side wall 72. As shown, a submerged lower portion 74 of the baffle end wall 62 is spaced apart parallel from the tank end wall 68 and an upper portion 76 of the baffle end wall 62 projects inwardly toward the rotating drum at an obtuse angle. The wiper 60 is attached to the upper portion 76 so that it projects at a selected angle therefrom for cooperative engagement and optimal removal of the concentrate product 100 from the rotating drum 56. A discharge port 78 formed in the tank wall 68 is in fluid communication with the concentrated product to drain or collect same from the unit 10.

Figure 4:
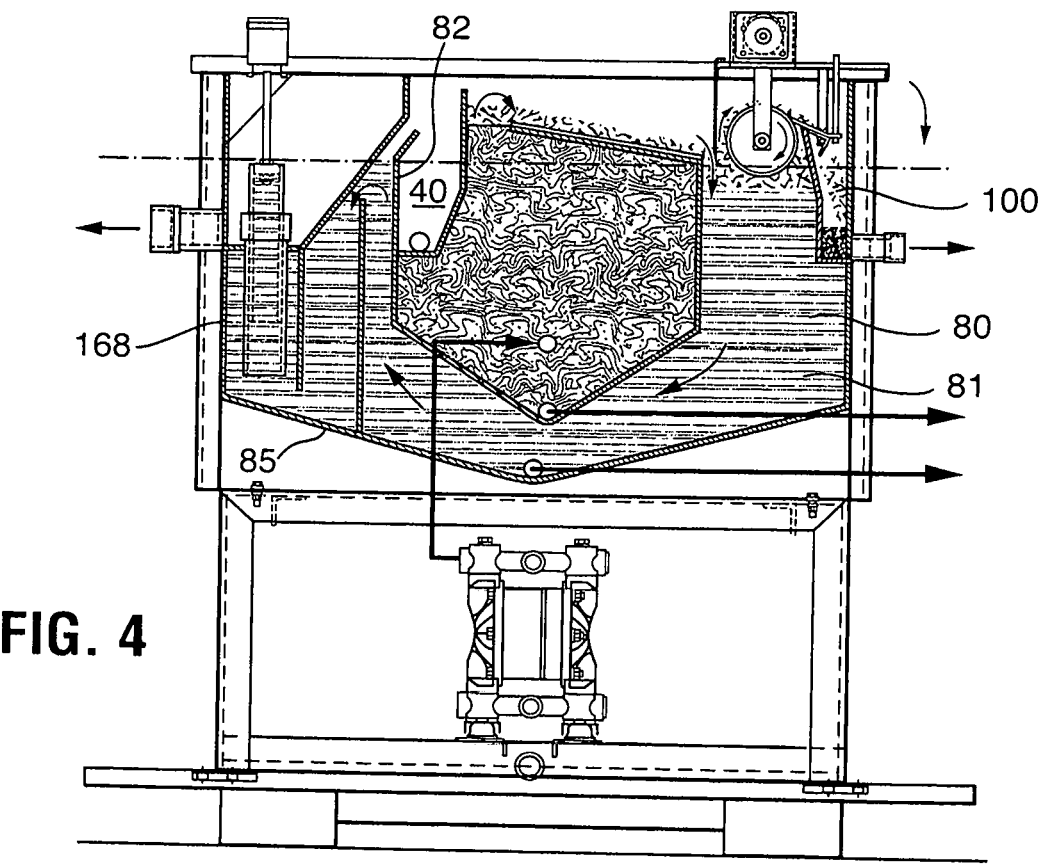
FIG. 4 shows the Secondary Quiescent/Coalescent chamber which is a continuation of the Mechanical Oil Separation chamber of FIG. 3 designed to allow more retention time within the unit for separation of fluids.
Figure 5:
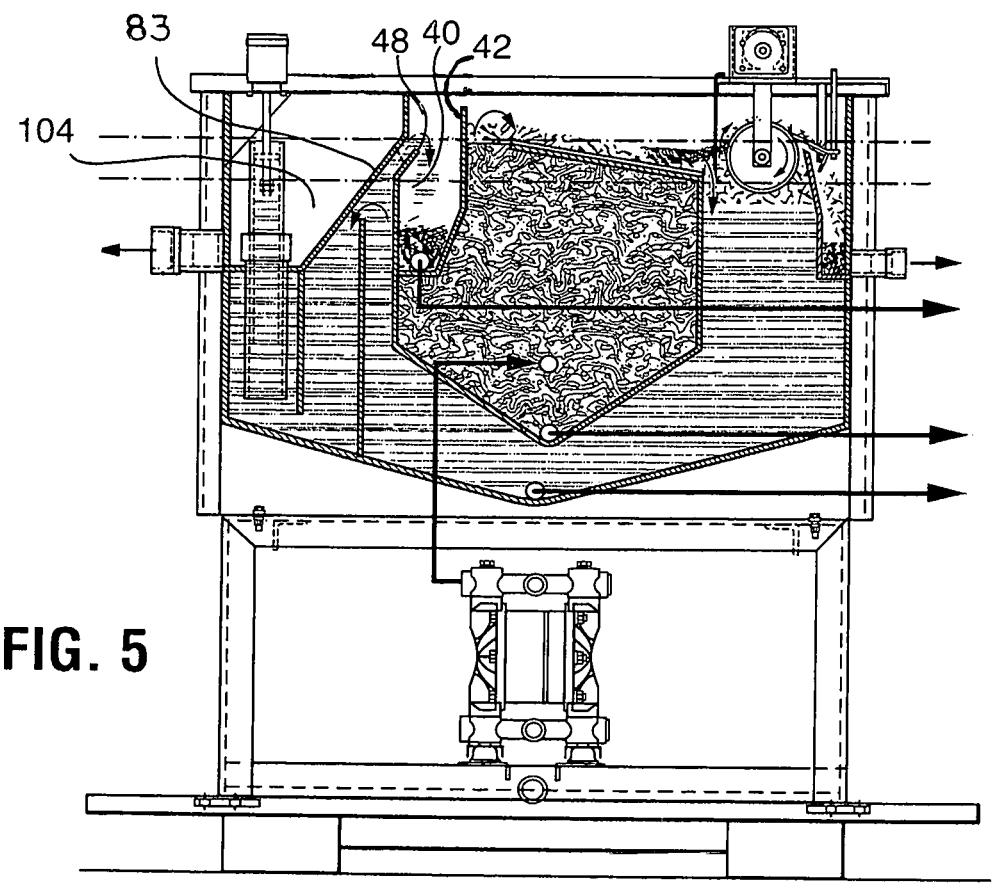
FIG. 5 shows the Oil Purge Chamber which receives any residual tramp oils that was not removed by the rotating drum wherein the tramp oils are allowed to continually build on the surface of the solution for a period of time.
Figure 6:
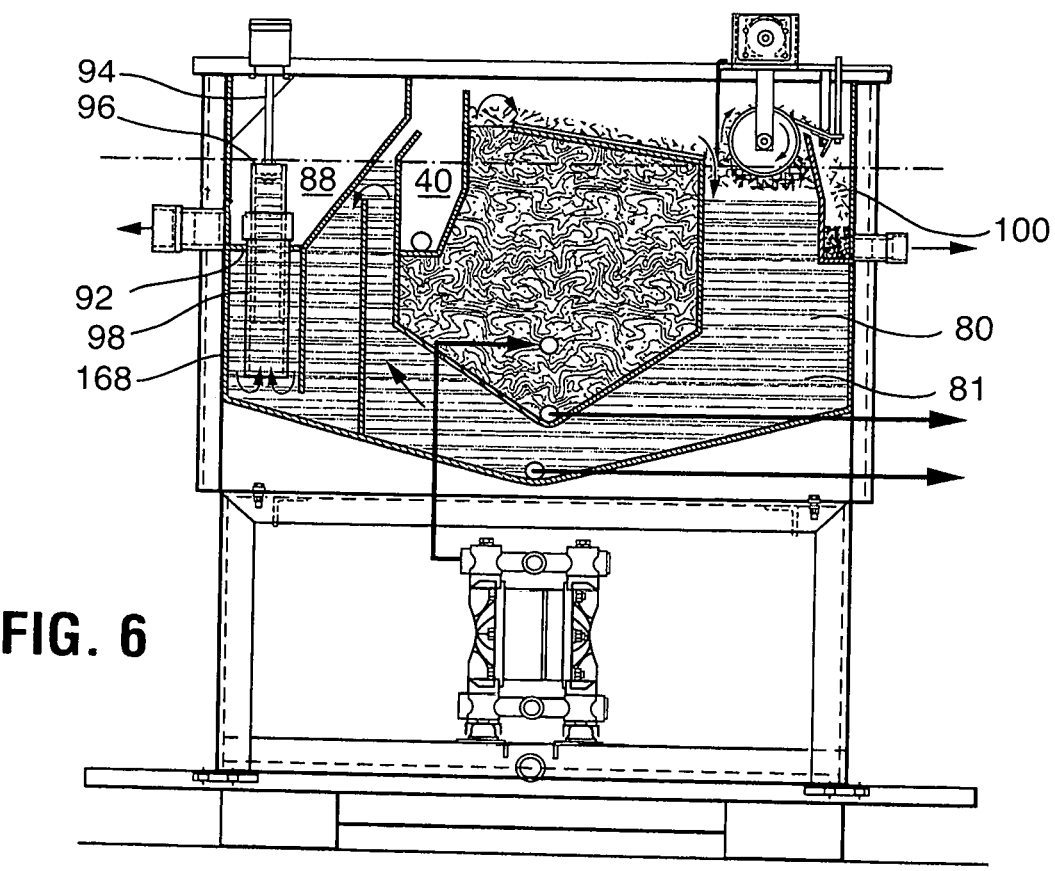
FIG. 6 shows the Clean Solution, Adjustable Outlet wherein the chamber receives clean solution from Stage 4 shown in FIG. 4 and the clean fluid flows up through an adjustable outlet pipe and discharges out to process.
Figure 7:
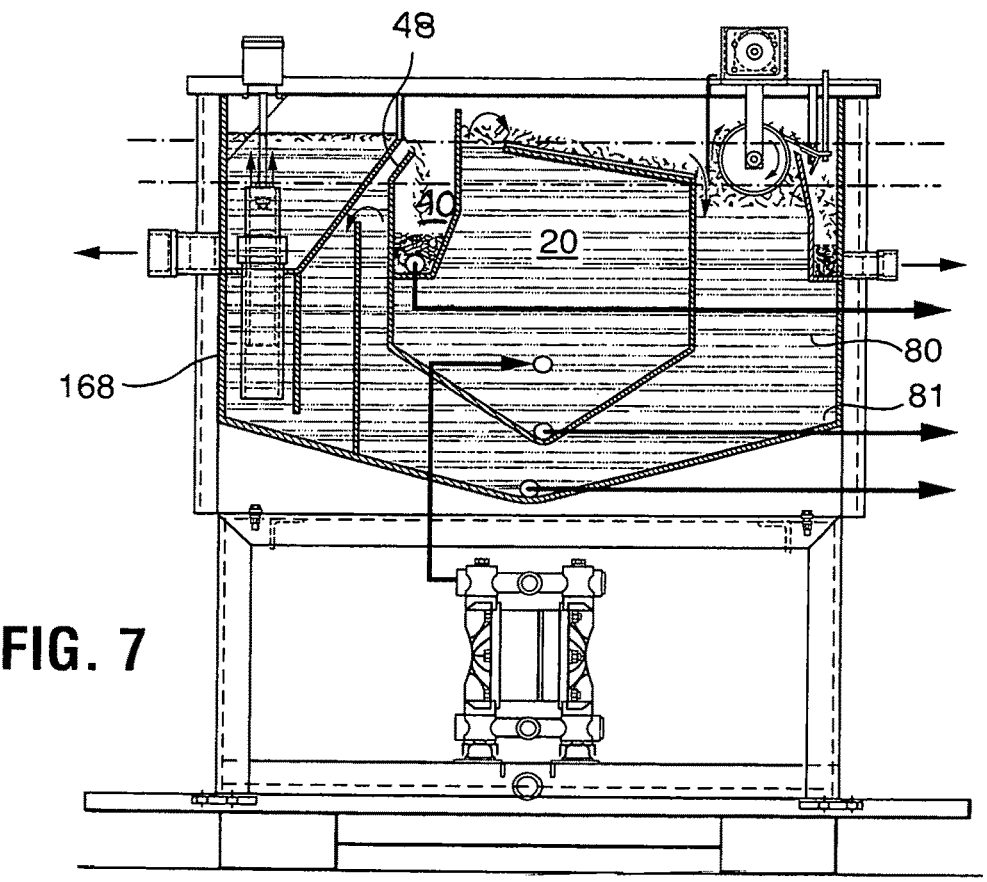
FIG. 7 shows the purge cycle and circulation of the composite feed fluid, concentrate product (tramp oil outlet), purge oil outlet, and clean fluid outlet.
Figure 8:
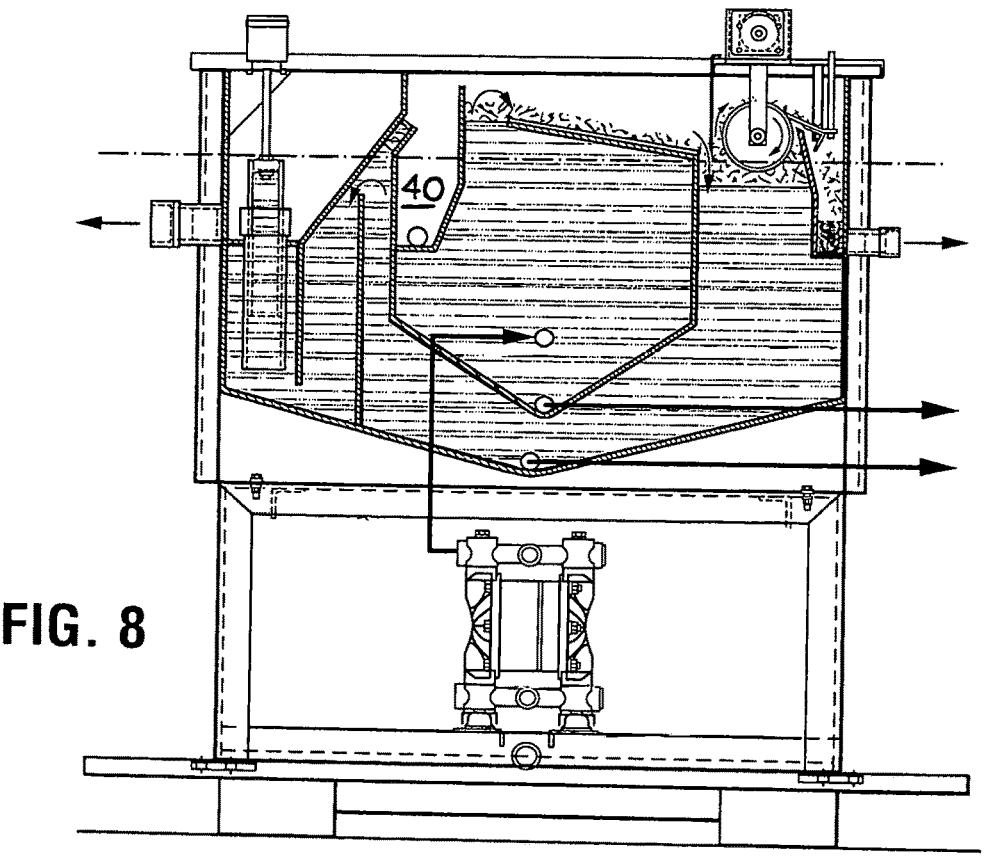
FIG. 8 shows the separation unit circulation of the composite feed fluid, concentrate product, purge product outlet, and clean fluid outlet.
Figure 9:
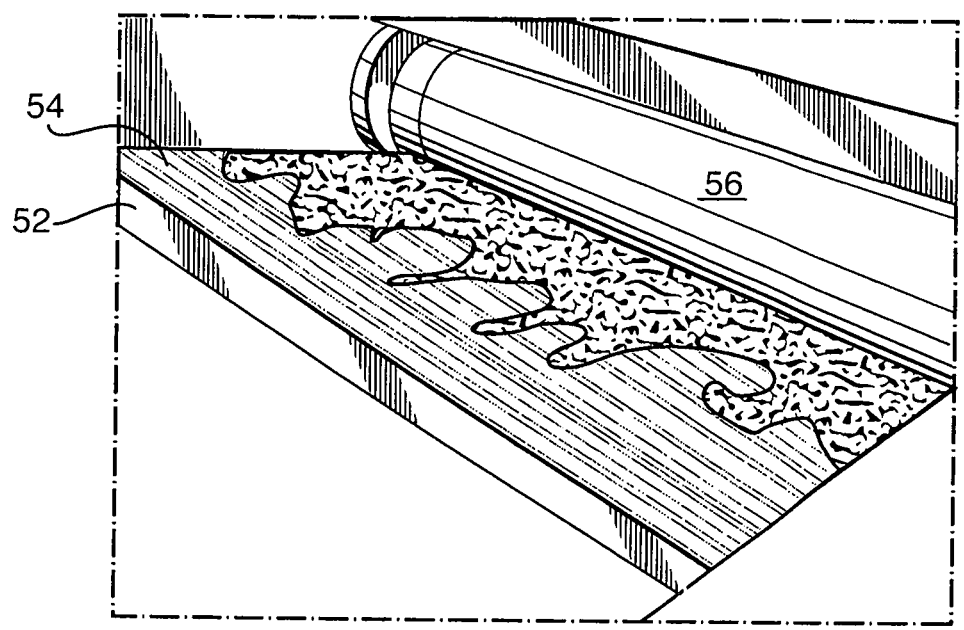
FIG. 9 shows the laminar flow of the lighter density fluid component comprising an oil floating on the higher density fluid component water over the fluid conveyor in close proximity to the rotating drum separator.
Figure 10:
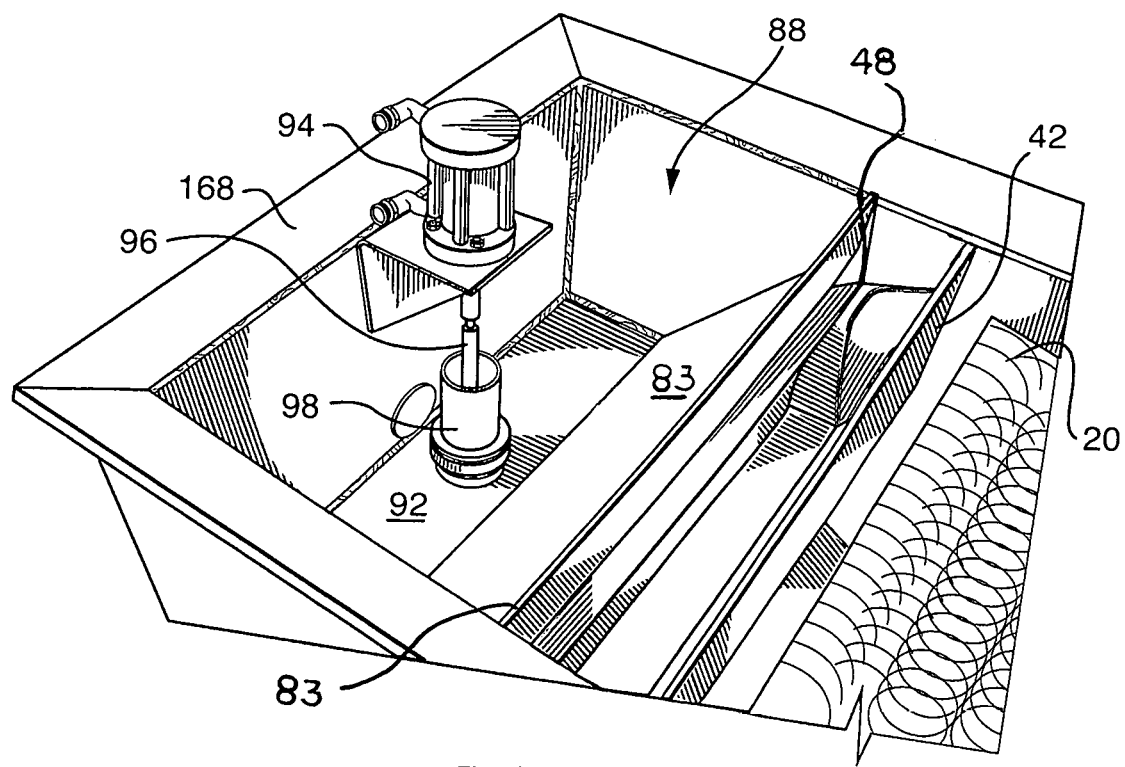
FIG. 10 is a perspective view of the clean solution chamber showing the adjustable outlet pipe and discharge using an air operated pancake cylinder and purge oil overflow weir.

The region of the tank directly below the rotating drum 56 and in fluid communication with the fluid conveyor 54 comprises the mechanical oil separation chamber 80 disposed between the quiescent coalescent chamber end wall 28, baffle end wall 62 and main tank side walls 70, 72. The heavier density portion of the composite solution (oil/water) comprises the water which will include at least a residual amount of contaminant or in this example the diluted oil product defining the diluted concentrate product 81 as shown in FIG. 4.

Stage 4—Secondary Quiescent/Coalescent Chamber—

The secondary quiescent/coalescent chamber 80 comprises the immediate area of the main tank 12 around the quiescent/coalescent chamber 20 extending from the tank end wall 68 to the opposing tank end wall 168. It includes the portion of the main tank and is a continuation of the mechanical oil separation chamber 80 in that it is designed to allow more retention time within the unit for separation of fluids. The diluted concentrate fluid product 81 continues to travel underneath the inner chamber 20, up and around a stationary baffle 82 which extends upward vertically from the bottom floor 84 of the main tank 12 a selected distance to a selected point below the level of the diluted concentrate fluid 81 within the chamber 80. A portion of the diluted concentrate product containing a higher concentration of the concentrate product will spill over the baffle 82 and flow beneath an oil purge chamber baffle 84 which extends vertically from the bottom of a clean solution chamber 86 a selected distance above the main tank floor 84. The lower portion 90 of the tank end wall 168 connecting to the tank floor 84 extending over to the oil purge baffle 84 defines the oil purge chamber 88. The baffles disposed in the main tank provides a means to keep the diluted concentrate product 100 moving while allowing sufficient residence time for fluid separation. The purge oil tank 88 includes a top wall 92 disposed below the surface of the diluted concentrate product 81 in the secondary quiescent coalescent chamber 80.

Stage 5—Oil Purge Chamber—

The oil purge chamber 88 receives the diluted concentrate product such as any residual tramp oils that was not removed by the rotating drum 56. In this compartment, the selected *substrate for example, the tramp oils are allowed to continually build on the surface of the solution for a period of time within the chamber 88 until the Purge Cycle initiated. The Purge Cycle can be initiated by using a density meter that automatically detects the density (or specific gravity) such as the MICRO MOTION 7828 Direct Insertion Density Meter by Emerson Products or INDUMAX CL250/CLW50D inductive conductivity sensor produced by Endress and Hauser, which are examples of conventional density/concentration measuring devices which can be used to monitor the unwanted fluid related to the carrier fluid, for instance water, or by manually selecting the "Manual Purge" button on the main control panel. The Purge Cycle activates the pancake cylinder on the clean water outlet chamber. The cylinder raises the adjustable overflow tube which in turn raises the level in the unit as set forth in (Stage 6). Approximately two inches allowing the residual unwanted fluid (tramp oil) to overflow the weir in the oil purge chamber and flow out to the oil outlet piping. The purge cycle level is preset (but is adjustable) so that no water or other carrier solution other than the lighter unwanted fluid (tramp oil) is allowed to overflow. Thus, upon initiating a purge cycle, an electronically actuated cylinder 94 withdraws a plunger 96 from a collection tube 98 which extends through the top wall 92 and into the chamber 88 a selected depth. With the plunger in the downward extended position cleaned liquid (the higher density water portion of the diluted concentrate product) is allowed to enter the clean fluid tank disposed above the purge tank 88 and between the main tank end wall 168 and a baffle 83 angled upward and extending a selected distance from and parallel to a weir 48 projecting from the top end wall 42 of the chamber 20. The cleaned product is discharged through the main tank end wall 168 discharge port 104. At a preset time, a Purge Cycle is initiated in which the level of the diluted concentrate product 81 amassing in the oil purge chamber 88 and the plunger 96 rises to block the discharge port 104 in the unit 88 and the liquid level is forced to rise (refer to Stage 6) a selected height of approximately 2", and the more concentrated diluted concentrate product comprising residual oil overflows a weir 48 and is collected in the Oil Purge Chamber 40 and flows out to the oil outlet piping. The Purge Cycle level is preset (but is adjustable) so that no water or solution other than unwanted fluid (tramp oils) is allowed to overflow.

Stage 6—Clean Solution, Adjustable Outlet—

The clean solution chamber 86 receives clean solution from Stage 4. The clean fluid flows up through an adjustable outlet pipe and discharges out to process. The key feature in this section is the adjustable overflow outlet pipe. Adjustability is accomplished by using an air operated, pancake cylinder to raise the outlet pipe to a preset height. This feature is completely automatic and is used to raise the fluid level in the OWS in order to accomplish the purge cycle (refer to Stage 5). When the cylinder raises the outlet pipe, the level in the unit increases allowing unwanted fluids to overflow out of the unit. This feature is on a timed cycle and can be adjusted to any range of seconds to hours. Initially, the unit time setting is—Raise level for 30 seconds (raise outlet pipe), return to normal operating level for 20 minutes (lower outlet pipe to original position). Repeat cycle.

Examples

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples.

A Dual & Multi-Stage Oil Removal product for separation and removal of tramp oils from liquids employs boundary layer theory principles for flat-plate, laminar flows for estimating flow velocity profiles and liquid level heights to ensure effective capture and removal of tramp oils. The novel design features include a coalescing/quiescent tank to allow free oils to rise to the surface, water conveyance for carrying unwanted oils to composite drum for removal Composite drum for mechanical removal of unwanted oils, automatic purge cycle for removal of residual oils, and automatic adjustable overflow working in tandem with the purge feature.

| MODEL | FLOW RATE (GPM) | WEIGHT EMPTY (LBS) | VOLUME FULL (GAL) | APPROXIMATE DIMENSIONS | | |
|---|---|---|---|---|---|---|
| | | | | A | B | C |
| B-5 | to 5 | 400 | 50 | 16" | 38" | 27" |
| B-10 | 5-10 | 500 | 65 | 20" | 38" | 27" |
| B-25 | 10-25 | 750 | 125 | 36" | 42" | 33" |
| B-50 | 25-50 | 900 | 215 | 40" | 46" | 36" |

Figure 11:
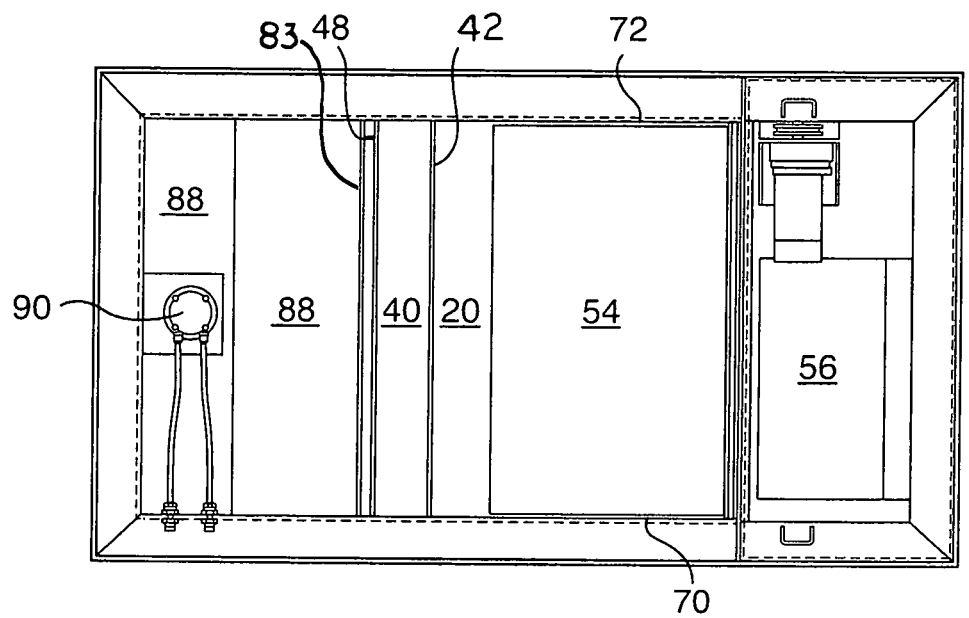
FIG. 11 is a top plan view of an oil water separator in accordance with the present invention showing a clean outlet compartment, purge compartment, purge outlet compartment, coalescing/quiescent tank, water conveyor and a single drum module.
Figure 12:
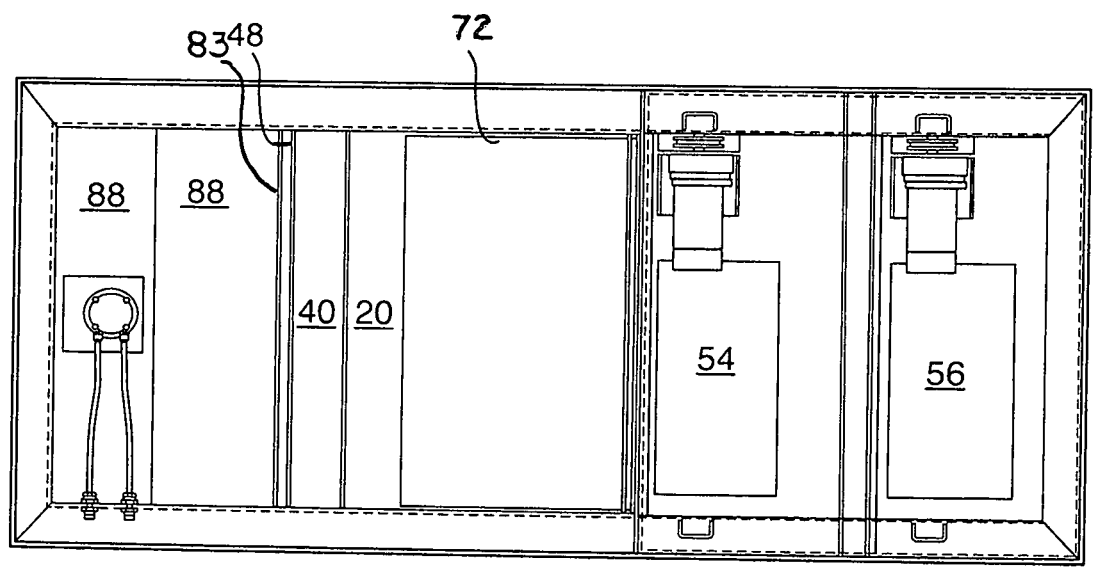
FIG. 12 is a top plan view of an oil water separator in accordance with the present invention showing a clean outlet compartment, purge compartment, purge outlet compartment, coalescing/quiescent tank, water conveyor and a double drum module.
Figure 13:
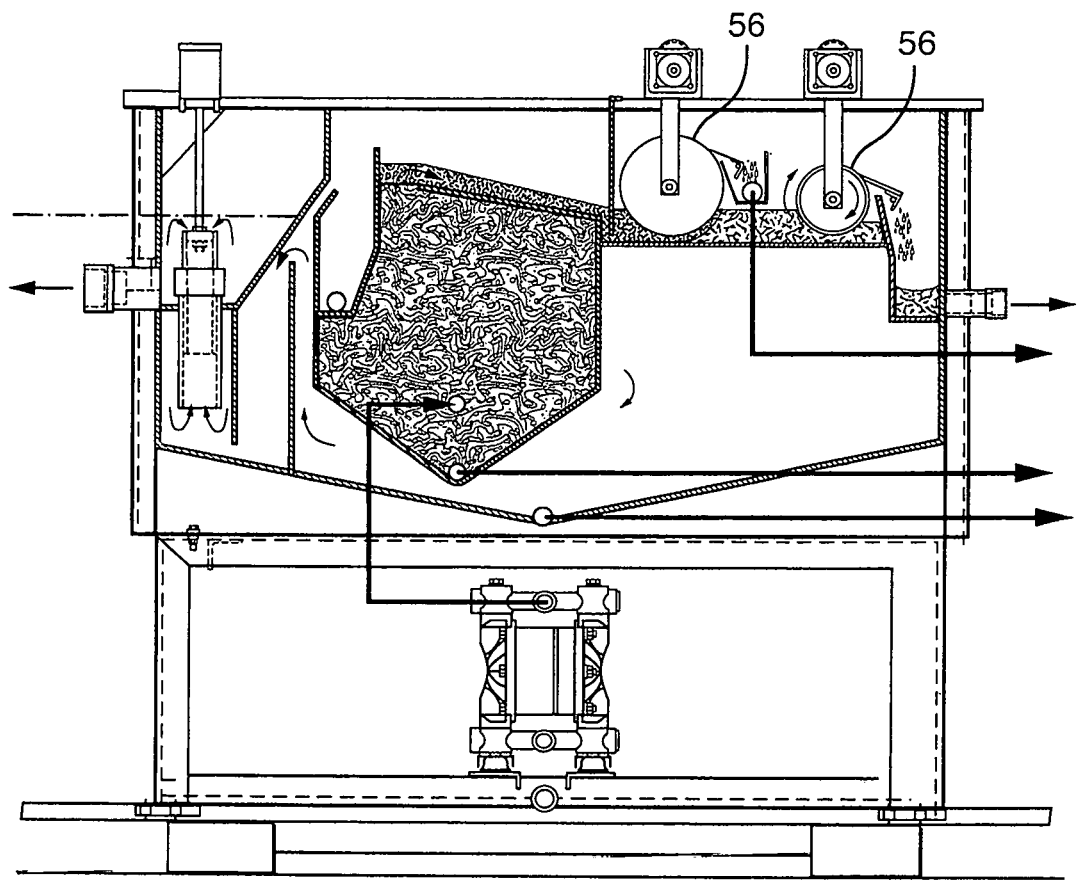
FIG. 13 is a side view showing the double drum oil water separator unit of FIG. 14.
Figure 14:
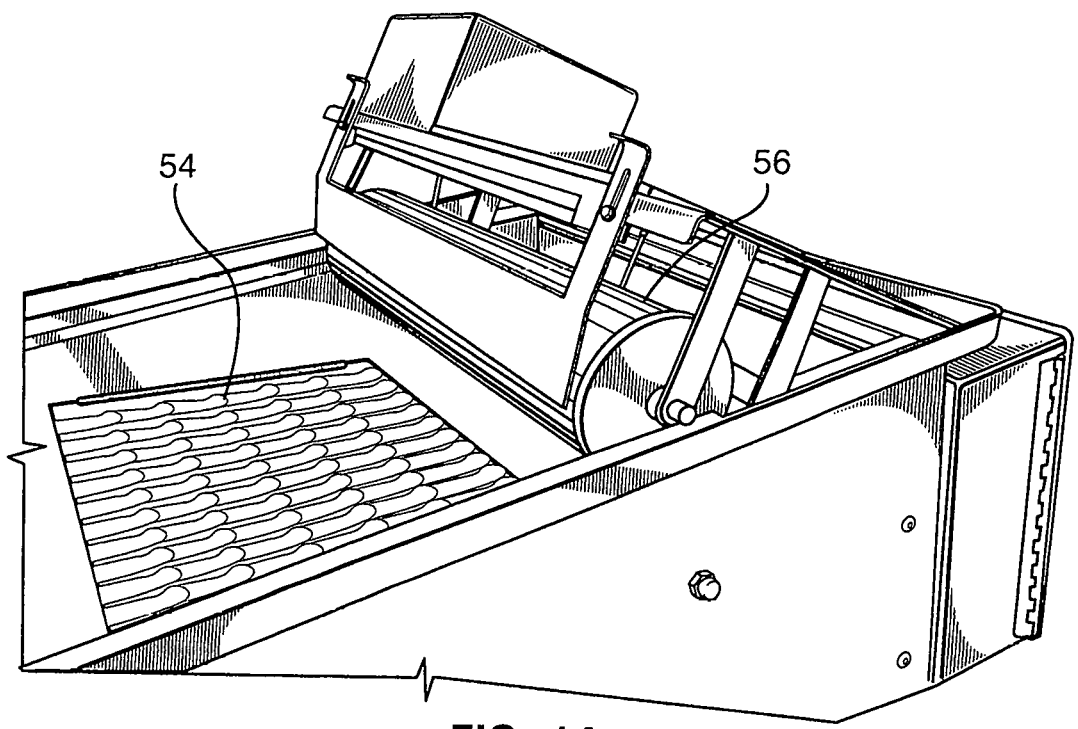
FIG. 14 is a perspective top view showing the rotating drum and wiper of an oil water separation unit in accordance with the present invention.
Figure 15:
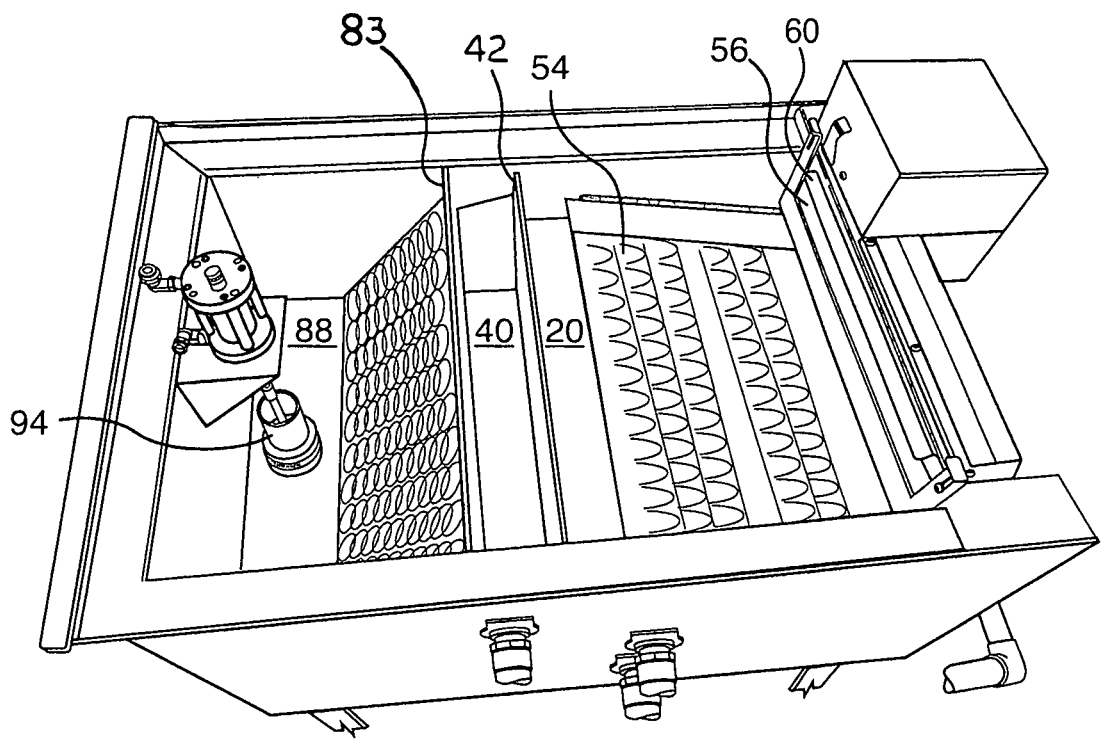
FIG. 15 is a perspective top view of an oil water separator in accordance with the present invention showing a clean outlet compartment, purge compartment, purge outlet compartment, coalescing/quiescent tank, water conveyor and a single drum module with wiper.
Figure 16:
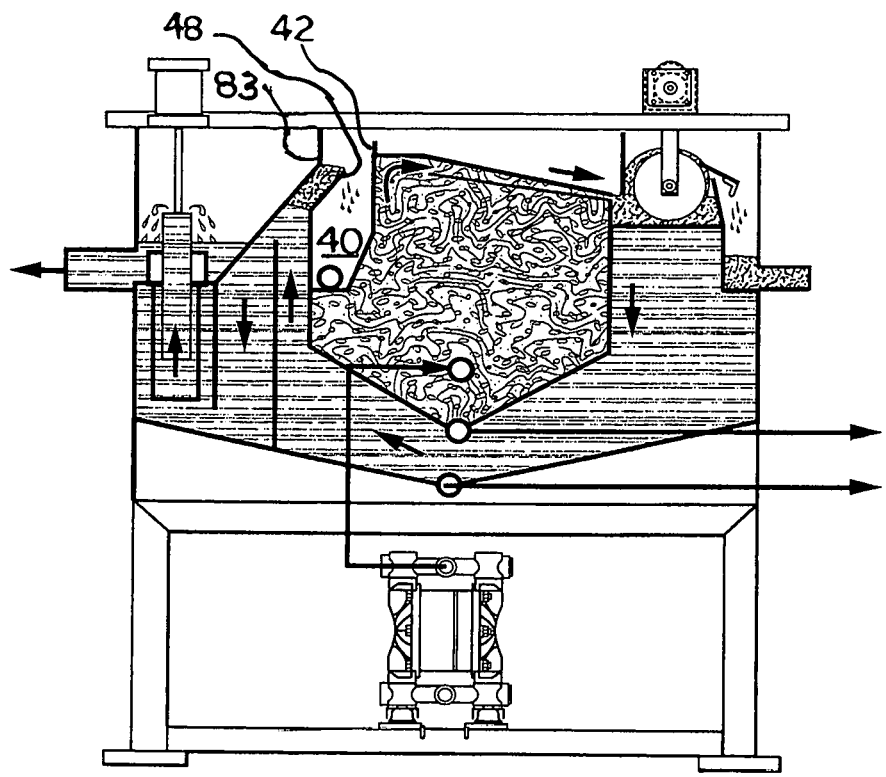
FIG. 16 is a flow diagram showing the features of an oil water separator in accordance with the present invention.
Figure 22:
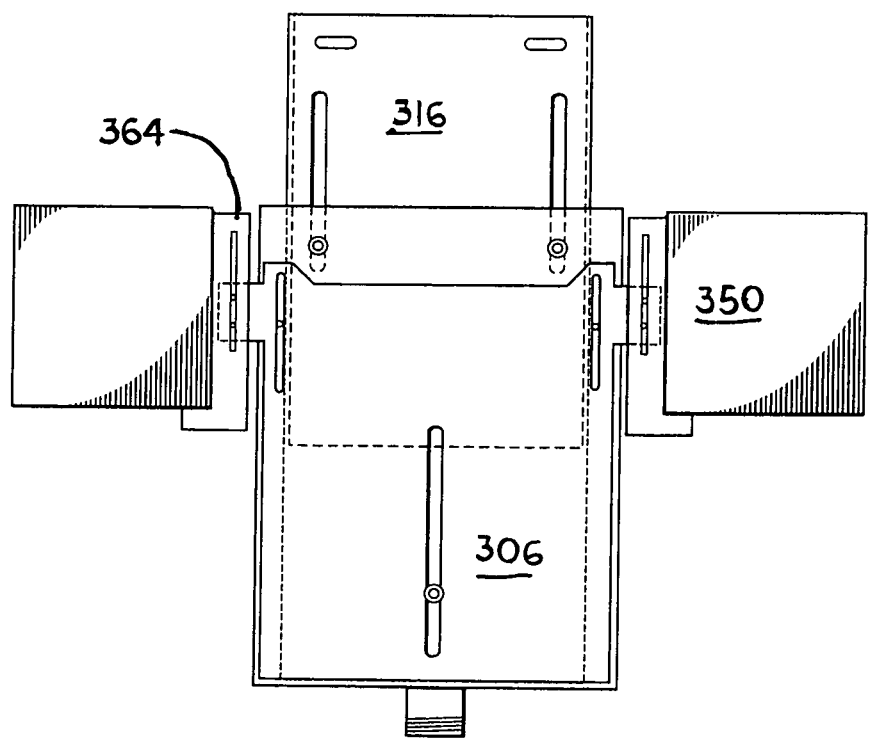
FIG. 22 is a front view of the skimmer showing the weir plate in the down position with the floats attaching thereto by the flat brackets attached to tabs extending from the weir plate which is slidable within the frame attaching to a the interior of a tank filled with fluid.
Figure 23:
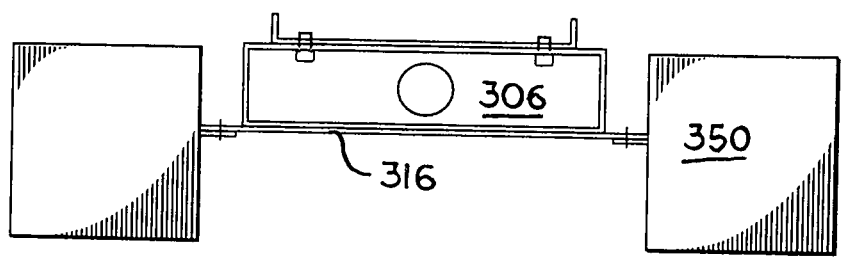
FIG. 23 is a bottom view of FIG. 22.
Figure 24:
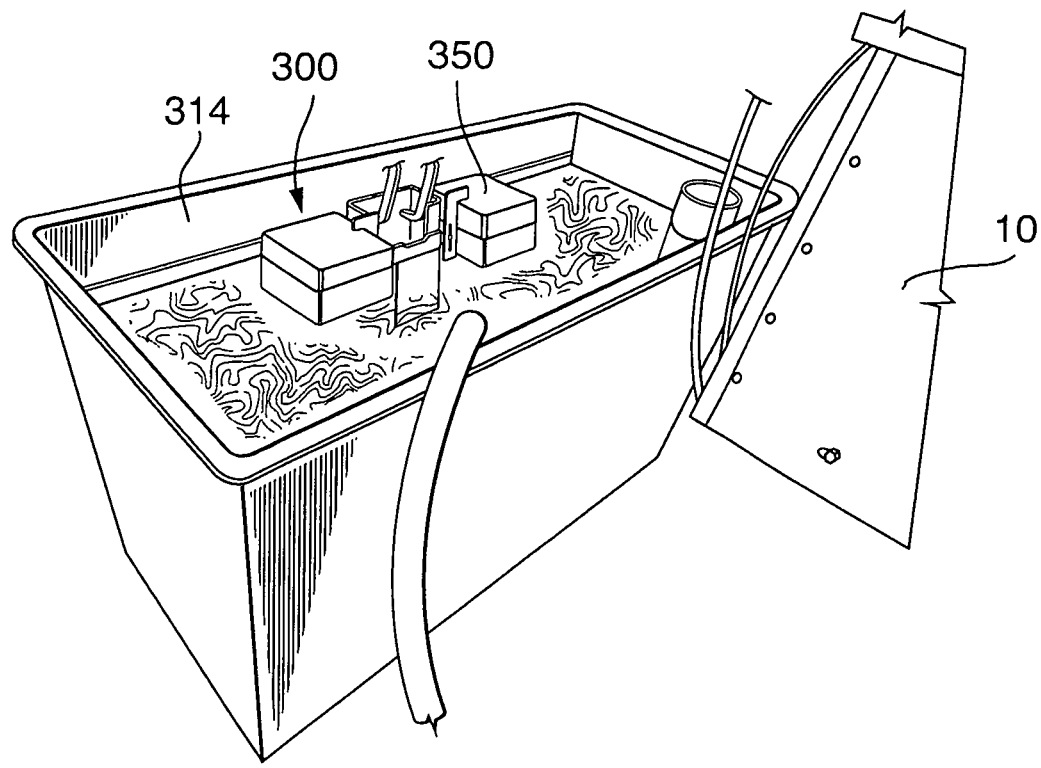
FIG. 24 is perspective view of the skimmer apparatus disposed in a tank for collecting water and oil fluids from a process showing the attachment of the skimmer to the interior wall of the tank with a pair of floats suspended in the fluid with the weir plate therebetween with the tank in fluid connection with an oil/water separator.
Figure 25:
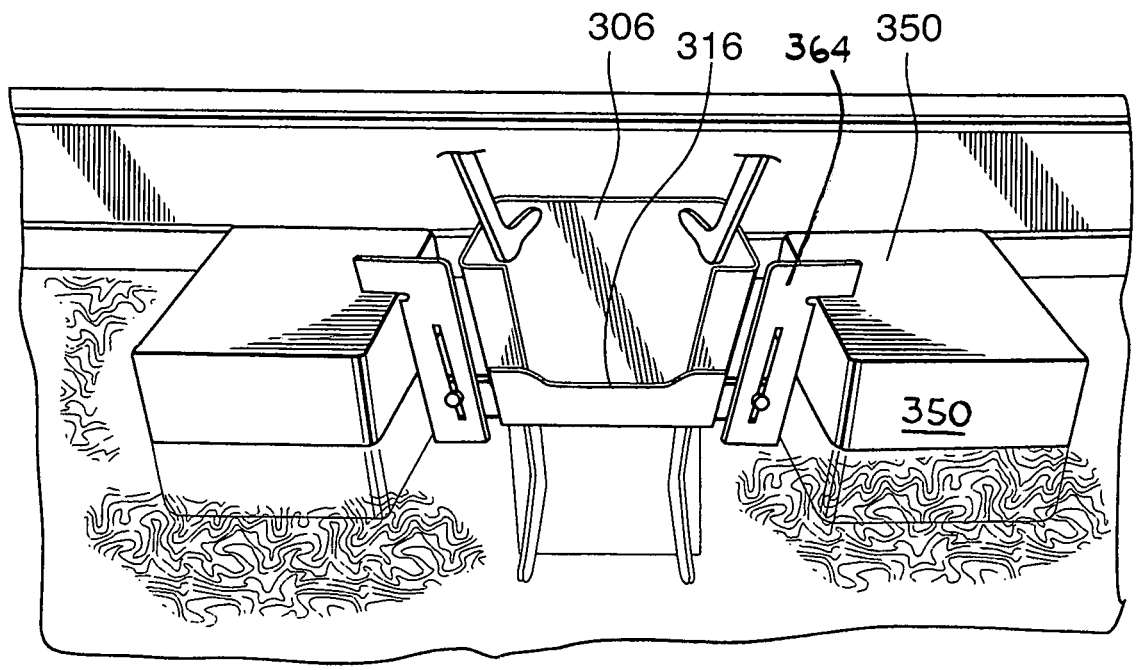
FIG. 25 is a perspective view of the skimmer apparatus of FIG. 24 disposed in a tank for collecting water and oil fluids from a process showing the attachment of the skimmer to the interior wall of the tank with a pair of floats suspended in the fluid with the weir plate therebetween.
Figure 26:
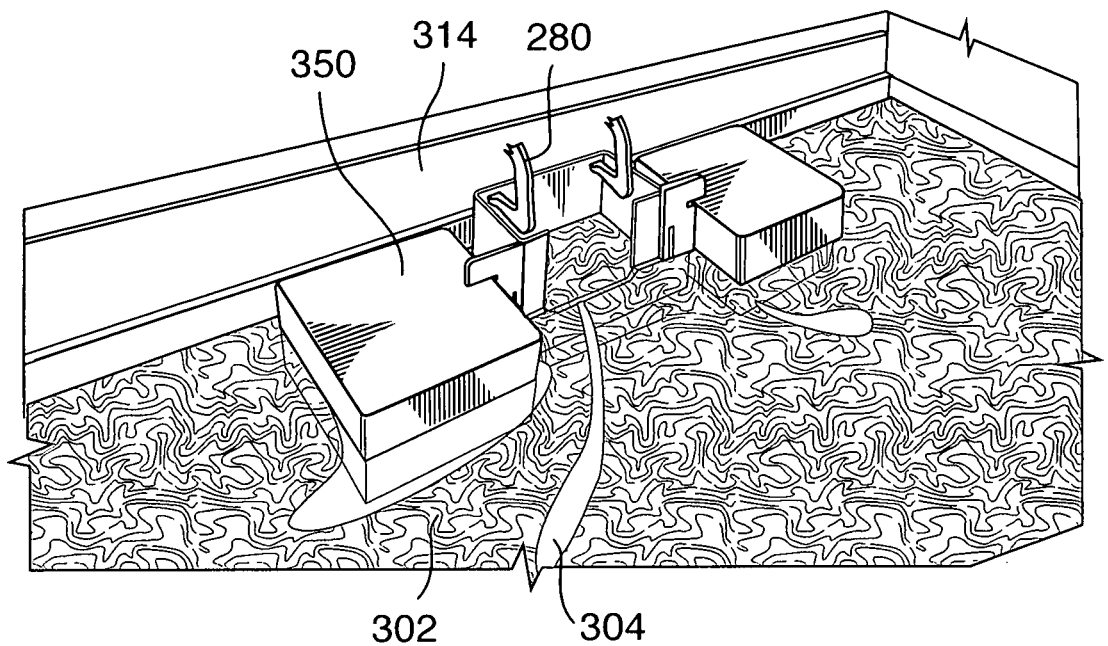
FIG. 26 is a perspective view of the skimmer apparatus of FIG. 25 disposed in a tank for collecting water and oil fluids from a process showing the attachment of the skimmer to the interior wall of the tank with a pair of floats suspended in the fluid attaching having float brackets including a vertical slot attaching to tabs or flanges extending from the weir plate therebetween and showing oil floating on water floating over the top of the skimmer weir plate.
Figure 27:
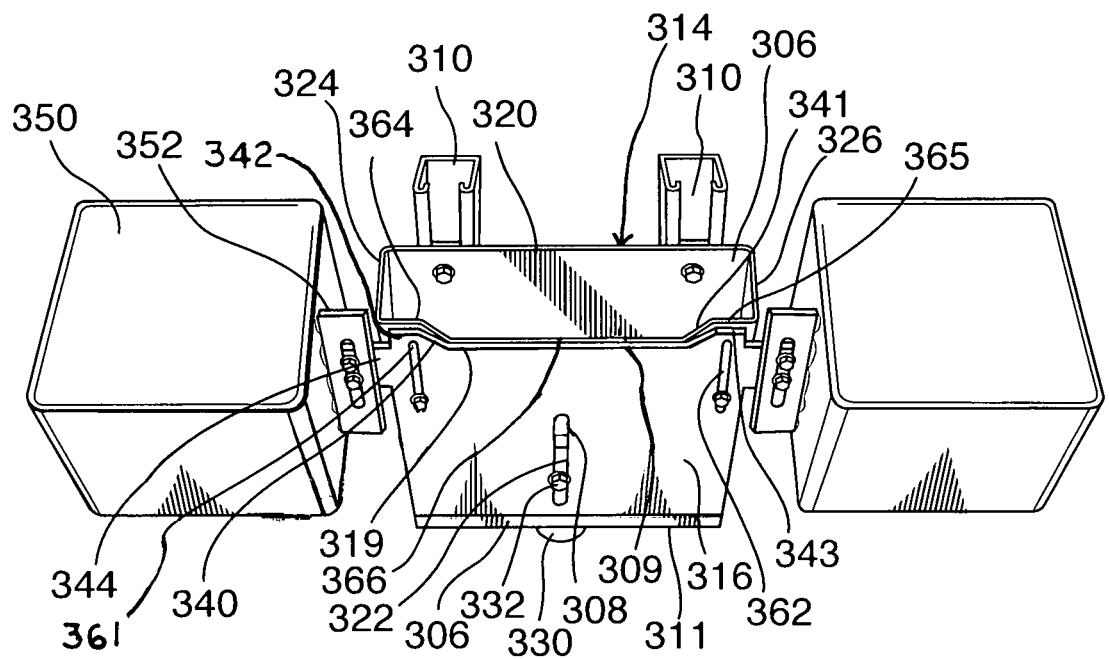
FIG. 27 is a perspective top view of the skimmer showing the brackets for holding the stationary skimmer receiver box to the side wall of a tank containing fluid to be processed and the flanges attaching to the weir plate.
Figure 28:
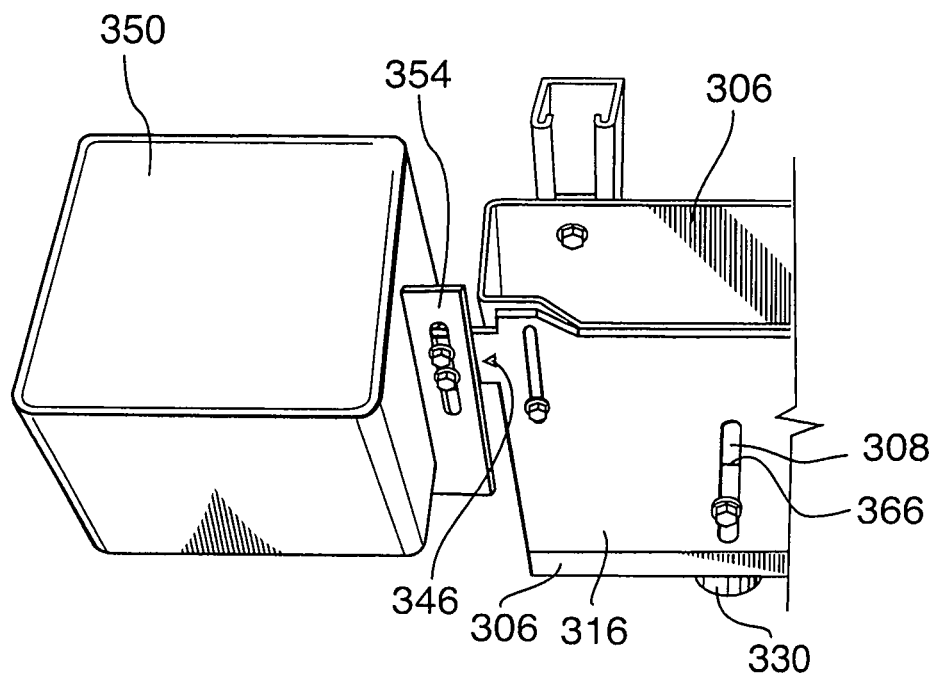
FIG. 28 is an enlarged view of FIG. 27 skimmer showing the brackets for holding the stationary skimmer receiver box to the side wall and a float attaching to a float bracket which is movable vertically with respect to the stationary receiver box and showing an indicator on the weir plate flanges pointing to indicia shown as a scale on the movable float bracket.
Figure 29:
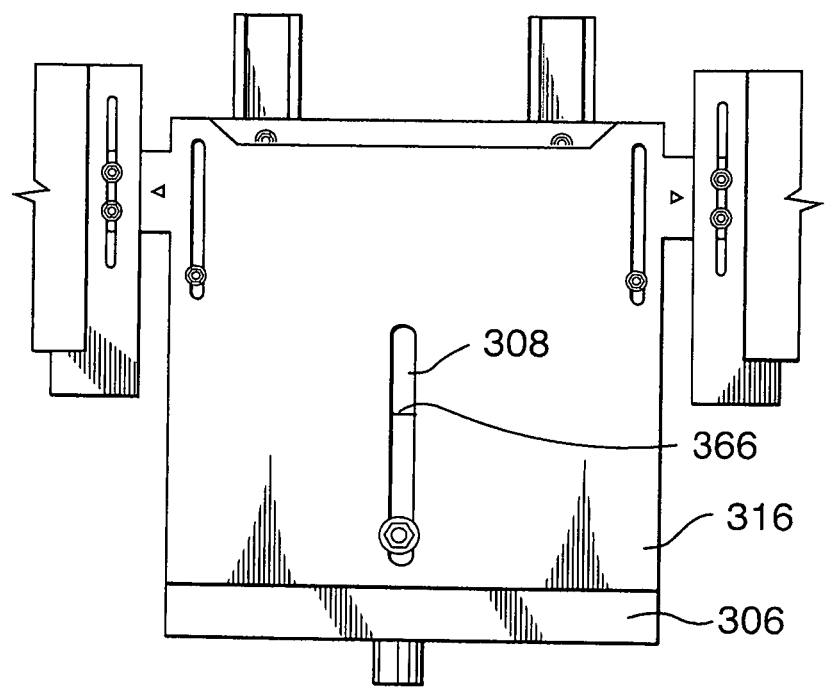
FIG. 29 shows a partial perspective front view of the skimmer shown in FIG. 27 showing the brackets for holding the stationary skimmer receiver box to the side wall and a float attaching to a float bracket which is movable vertically with respect to the stationary receiver box and showing an indicator on the weir plate flange pointing to indicia shown as a scale on the movable float bracket.
Figure 30:
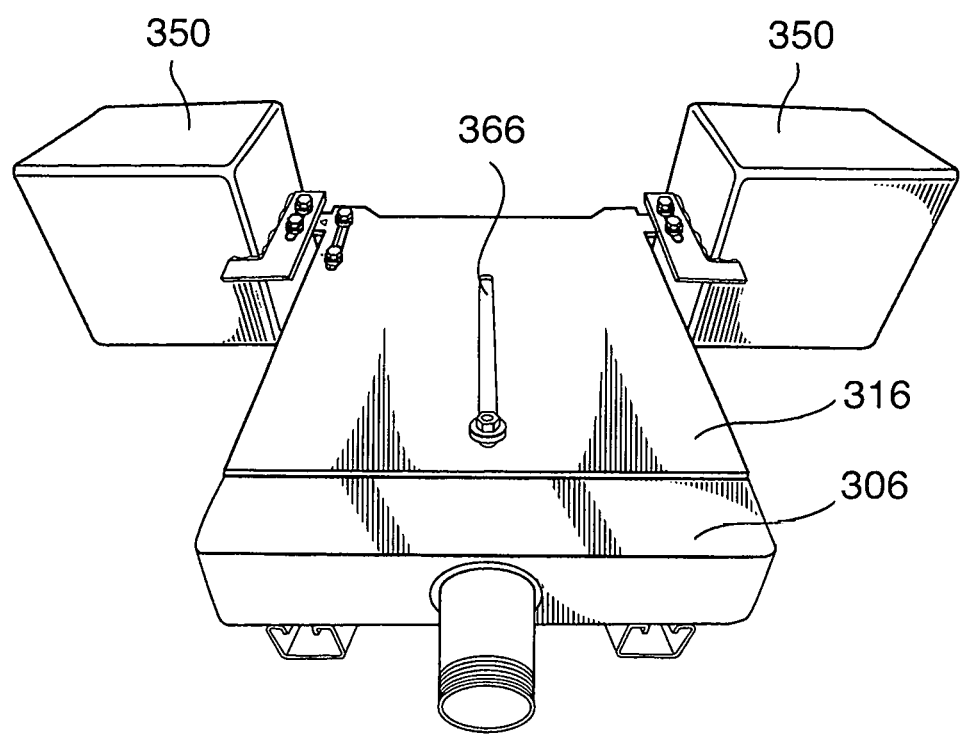
FIG. 30 shows a front perspective view of the skimmer with an attachment nut disposed in a vertical slot for slidably holding the weir plate within the receiver box, showing the skimmed fluid downspout and the floats held by movable float brackets to the stationary receiver.

As illustrated in FIG. 11, in the above identified models, oily solution enters the Coalescing Chamber where tramp oil in solution is allowed to rise to the surface. The oil is carried to the Composite Drum Station via the water conveyor. The tramp oil adheres to the Composite Rotating Drum and is removed from solution. The Drum speed is adjustable ranging up to 9 RPM. The solution continues to flow underneath the Coalescing Tank, up and over Baffle #1, down and around Baffle #2, up through the Adjustable Overflow Tube and through the Solution Outlet port. Oil-free solution flows out the Solution Outlet port and back to process.

The Automatic Purge feature is fully automatic. At a pre-set time, the cylinder actuates raising the overflow tube to a pre-set height and residual tramp oil is forced over a weir and out the Purge Outlet port. This feature allows for the capture of residual tramp oils that potentially migrates past the Rotating Drum.

Skimmer

An oil/water skimmer 300 is a primary separation process which removes a layer of oil 302 floating on a surface of oil contaminated water 304 to be processed which subsequently concentrated and separated in an oil water separator which removes tramp oils or other fluids, such as hydraulic oils, with specific gravity less than that of the operating fluid are required to be removed from operating fluid such as water, lubri-coolants or other liquids. The skimmer supplies concentrated oil water composite fluid to a holding tank or an oil/water separator apparatus designed for use in industrial applications in which unwanted tramp oils or other fluids, such as hydraulic oils, with specific gravity less than that of the operating fluid are required to be removed from operating fluid such as water, lubri-coolants or other liquids.

The skimmer 300 for the oil water separator, comprises or consists of the following components. A stationary receiver box 306 includes a back wall 320 connecting to a front wall 322 having side flanges 364 and 365 extending upward to the top of the box with a central wall section 366 extending upward a selected distance between the left and right side flanges 364. The back wall 320 and front wall 322 connects to side walls 324 and 326 respectively, all of which connect to a bottom wall 328 having a aperture therein for connecting to a tube or pipe 330 in fluid connection to a holding tank or oil/water separation unit. A movable weir plate 316 includes a central vertical slot 308 therein extending from a selected position below the top edge 309 to the bottom edge 311 of the plate 316. The weir plate 316 also includes a pair of vertical slots 361 and 362 respectively disposed near the top of the plate 316 along the along each side, whereby the weir plate 316 is slidably supported by a pair of front flanges 364 extending from the front panel of the stationary receiver box 306. A holding means such as a bolt and nut, or other fastener 332 movably secures the weir plate 316 to the outer surface of the receiver box 306.

Holding means such as a clamp 280 secure the skimmer holding brackets 310 to a tank 314 by attaching to a rear surface 334 supports the stationary receiver box 306 on an interior surface 312 of a tank 314 containing water having oil floating on a surface thereof. A vertically adjustable skimming weir plate 316 with central vertical slot 308 therein is in slidable engagement with the stationary receiver box 306. A horizontal weir top edge 309 is cut or formed whereby a central longitudinal section 319 extends below the shoulder 342 of the weir plate 316 a selected distance connecting to an angled portion 340 and 341 extending upward to join the side shoulder 342 and 343 respectively.

One or more floats, and preferably at least one pair of floats 350 shown as square or rectangular bodies can be formed in cylindrical, spherical or other shape are sized to provide selected buoyancy to the weir plate 316. It is anticipated that removable plugs can be removed from the floats to adjust the float depth. A float 350 includes a longitudinal float bracket 352 attaching thereto at the side; however, the attachment of the bracket may at another selected location so long as the float bracket 352 extends from a side of the float 352 adjacent the receiver box 306. The outer edge of the float bracket 352 includes a vertical slot for accepting a fastener or nut/bolt arrangement releasably and adjustably attaching to the vertical weir plate side flange or tabs 344 removably and adjustably affixed to tabs extending therefrom. The vertical float flange 344 includes an arrow or other sight indicator 346 which points to a column of vertical indicia 354 disposed on the side of the float brackets 352 allowing for vertical adjustment of the floats with respect to the slidable weir plate 316.

The skimmer separates and concentrates oil from an oil/water mixture based upon the specific gravity of the lighter fluid floating on the denser and heavier fluid whereby the concentrated oil containing water contaminants is further processed in an oil water separator apparatus which can be of a minimum size for concentrating the oil based on a smaller throughput volume as compared to the oil and water fluid prior to being processed with the skimmer. An important feature is the attachment of the slide plate by a single bolt or pin 332 to allow the weir plate to pivot slightly and minimize binding caused by waves of fluid motion against the floats which tend to cause the weir plate 316 to cock and get in a bind. Use of a single attachment point allows some pivoting of the skimmer weir 316 reducing friction on the weir plate 316 and minimizing binding of the weir plate 316 against the receiver box 306.

A slidable weir plate including a central longitudinal slot on the lower portion is slideably received within the stationary receiver box and slidably held in an aligned selected position with respect to the stationary receiver box and held in position by a single bolt extending from a surface of said stationary receiver box cooperatively engaging the central longitudinal slot of the slidable weir plate allowing the plate "play" or limited movement to eliminate binding of the plate within the receiver box when movement of the liquid therein causes movement of floats held by the slidable weir plate. The top portion of the slidable weir plate includes a slightly lower cutaway portion comprising a weir for removal of oil floating on the surface of a fluid in fluid communication with the stationary receiver box.

More particularly, the a skimmer for an oil water separator includes a stationary receiver box including means for slidably securing a weir plate to an outer surface of the stationary receiver box and bracket means for supporting the stationary receiver box onto a interior surface of a tank containing water having oil floating of a surface thereof. A slidable panel defining a weir plate including a central vertical slot therein in slidable engagement with the stationary receiver box means for movably securing the weir plate having including a trough forming horizontal weir extending across a selected width and depth of a top edge of the slidable panel. The weir plate includes a pair of spaced apart opposing side tabs extending from the weir plate in slidable cooperative engagement with a pair of floats removably secured to the tabs by a vertical side flanges including vertical slots therein for adjustably engaging means for securing each one of the vertical side flanges to a respective side tab of the weir plate. Vertical flanges or the tabs include indicia for vertical adjustment of the floats with respect to the weir plate.

As shown in FIG. 17-30, a pair of generally rectangular floats are removably and adjustably attached by longitudinal vertical flanges extending from the inner sides to cooperatively and slidably engage side plate side tabs extending outward laterally from the upper portion of the slidable weir plate. The float flanges and/or slide plate tabs include indicia to enable the floats to be adjusted with respect to the slide plate in order to optimize the skimming capability of the skimmer by adjusting the position of the slide plate weir with respect to the oil floating on the surface of the contaminated fluid and the level of water in the tank and stationary reservoir. Moreover, the attachment of the slide plate by a single bolt or pin allows the plate to pivot slightly and minimize binding caused by waves of fluid motion against the floats which tend to cause the weir plate to cock and get in a bind. A point of novelty lies in using a single attachment point allowing some pivotaiton of the skimmer weir reducing friction on the weir plate and minimizing binding of the weir plate against the receiver box.

FIGS. 20-30 illustrate the skimmer float attachment brackets showing the depth indicia as a vertical scale of hash marks formed, marked, or applied as a tape to the movable vertical inner sides of the brackets holding the floats to the skimmer. The skimmer weir plate is shown in the down position with the floats attaching thereto by the flat brackets slidable with respect to the outer wall of the stationary receiver box attaching to a the interior of a tank filled with fluid. The brackets hold the stationary skimmer receiver box to the side wall and a float attaching to a float bracket which is movable vertically with respect to the stationary receiver box and showing an indicator on the receiving box pointing to indicia shown as a scale on the movable float bracket.

Process Method

A method for removing a first fluid such as an oil having a first density floating on a second fluid such as water having a greater density comprises the following steps. The mixture of the first fluid and the second fluid are pumped into a separation tank. The first fluid concentrates and accumulates due to surface tension forces of a first less dense layer floating on a second more dense fluid in the separation tank. Surface tension is the elastic tendency of a fluid surface which makes it acquire the least surface area possible. At the liquid-liquid interface of liquids having different densities, surface tension results from the greater attraction of like liquid molecules to each other (due to cohesion) than to the molecules of the dissimilar liquid (due to adhesion). The net effect is an inward force at its surface that causes the denser liquid to behave as if its surface were covered with a stretched elastic membrane. Separation of oil and water is caused by a tension in the surface between dissimilar liquids. This type of surface tension is called "interface tension". The first fluid from is separated from the second fluid by skimming the first fluid off of the second fluid in a skimmer comprising a stationary receiver box including a central vertical stationary receiver box slot therein. Bracket means for supporting the stationary receiver box is used to fasten it to an interior surface of the separation tank. The skimmer includes a vertically moveable weir plate including a central vertical slot therein in slidable engagement with a holding means extending from a front wall of the stationary receiver box. The weir plate includes a horizontal weir extending across a selected width of the top thereof in fluid communication with the first fluid and the second fluid contained in the separation tank. The skimmer includes a pair of floats having vertical side flanges with indicia disposed thereon removably and adjustably affixed to a weir plate side tab extending from each side of the weir plate cooperatively engaging the float flange. The float flanges include indicia for vertical adjustment of the floats with respect to the indicator on the side tab of the weir plate. The level of the weir plate is adjusted with respect to the level of the first fluid and the second fluid in the separation tank. The first fluid floats on the second fluid pouring over a top edge of the weir plate and flowing into the stationary receiver and through a conduit to a holding tank or fluid density separator unit. The concentrated first fluid product still contains at least some of the second fluid as a contaminant and is pumped into a holding tank or flows directly from the skimmer to the fluid density separator. The fluid density separator (oil/water separator), comprises a chamber with a top and bottom surface, a wall surrounding the periphery of the chamber; an inlet port in the top surface of the chamber; an outlet port on the chamber; a spiral plate, the spiral plate having an outer edge in sealing engagement with the wall of the chamber and the spiral plate formed in an upright funnel shape; and a center spillway, extending from the inlet port to the bottom surface of the chamber separating the first fluid from the second fluid. The concentrated first fluid is separated and collected separately from the second fluid which is recycled or deposed of as waste material.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

We claim:
1. A skimmer for separating a lighter fluid floating on a denser fluid, comprising:
   a stationary receiver box including means for slidably securing a weir plate to an outer surface of said stationary receiver box;
   bracket means for supporting said stationary receiver box onto a interior surface of a tank containing a composite fluid comprising a lighter fluid floating on a denser fluid;
   a slidable panel defining a weir plate including a central vertical slot therein in slidable engagement with said stationary receiver box means for movably securing said weir plate including a trough forming a weir extending across a selected width and depth of a top edge of said slidable panel;
   said weir plate including a pair of spaced apart opposing side tabs extending from said weir plate in slidable cooperative engagement with a pair of floats removably secured to said tabs by a vertical side flanges including vertical slots therein for adjustably engaging means for securing each one of said vertical side flanges to a respective side tab of said weir plate;
   said vertical flanges or said tabs including indicia for vertical adjustment of said floats with respect to said weir plate.

2. The skimmer of claim 1, wherein said lighter fluid comprises an oil.

3. The skimmer of claim 1, wherein said denser fluid comprises water.

4. The skimmer of claim 1, wherein at least one of said vertical side flanges includes at least one sight indicator pointing to a column of vertical indicia disposed on said bracket means for indicating the vertical adjustment of said pair of floats with respect to said weir plate.

5. The skimmer of claim 1, wherein each one of said pair of floats include a removable plug to adjust the depth.

6. The skimmer of claim 1, wherein said means for slidably securing a weir plate to an outer surface of said stationary receiver box comprises a single pin engaging said central vertical slot allowing said weir plate to pivot and minimize binding upon sliding engagement with said receiver box in accordance with movement of said pair of floats according to a level of said composite fluid.

7. A method for removing a first fluid having a first density floating on a second fluid having a greater density comprising the steps of:
   pumping a mixture of said first fluid and said second fluid into a separation tank;
   accumulating and concentrating said first fluid in a layer floating on said second fluid in said separation tank;
   separating said first fluid from said second fluid by skimming said first fluid off of said second fluid in a skimmer comprising a stationary receiver box including a central vertical stationary receiver box slot therein, bracket means for supporting said stationary receiver box onto a interior surface of said separation tank, said skimmer including a vertically moveable weir plate including a central vertical slot therein in slidable engagement with a holding means attaching to said stationary receiver box, said weir plate including a horizontal weir extending across a selected width of the top thereof in fluid communication with said first fluid and said second fluid contained in said separation tank, said skimmer including a pair of floats having vertical side flanges with indicia disposed thereon removably and adjustably affixed to a weir plate side tab extending from each side of said weir plate cooperatively engaging said float flange, said float flanges including indicia for vertical adjustment of said floats with respect to said indicator on said side tab of said weir plate, and adjusting the level of said weir plate with respect to the level of said first fluid and said second fluid in said separation tank, said first fluid floating on said second fluid pouring over a top edge of said weir plate and flowing into said stationary receiver and through a conduit to a holding tank or fluid density separator unit; and pumping said first fluid containing a portion of said second fluid from said skimmer from said holding tank or said skimmer to said fluid density separator comprising a chamber with a top and bottom surface, a wall surrounding the periphery of said chamber; an inlet port in said top surface of said chamber; an outlet port on said chamber; a spiral plate, said spiral plate having an outer edge in sealing engagement with said wall of said chamber and said spiral plate formed in an upright funnel shape; and a center spillway, extending from said inlet port to said bottom surface of said chamber separating said first fluid from said second fluid.

8. The method of claim 7, wherein said first fluid comprises an oil.

9. The method of claim 7, wherein said second fluid comprises water.

10. An oil and water separator and skimmer apparatus, comprising:
   a) skimmer for separating oil from an oil and water composite fluid, comprising:
   a stationary receiver box including means for slidably securing a weir plate to an outer surface of said stationary receiver box;
   bracket means for supporting said stationary receiver box onto a interior surface of a tank containing water having oil floating of a surface thereof;
   a slidable panel defining a weir plate including a central vertical slot therein in slidable engagement with said stationary receiver box means for movably securing said weir plate including a trough forming a weir extending across a selected width and depth of a top edge of said slidable panel;
   said weir plate including a pair of spaced apart opposing side tabs extending from said weir plate in slidable cooperative engagement with a pair of floats removably secured to said tabs by a vertical side flanges including vertical slots therein for adjustably engaging means for securing each one of said vertical side flanges to a respective side tab of said weir plate;
   said vertical flanges or said tabs including indicia for vertical adjustment of said floats with respect to said weir plate; and
   b) an oil water composite fluid separator in flow communication with said skimmer receiving oil and water composite fluid therefrom, said oil water composite fluid separator, comprising:
   a frame supporting a tank having opposing sidewalls connecting to a first end wall and a second end wall which join a pair of inclined bottom panels, and said tank including a selected level with a fluid comprising a major amount of water and a minor amount of oil defining a water reservoir;
   a pump for transporting an oil water composite fluid from a source to an oil water composite fluid inlet;
   a coalescing chamber in fluid communication with said oil water composite fluid inlet, said coalescing chamber including means for evacuating said coalescing chamber defining a drain, and an opening;
   said coalescing chamber including an inclined cover extending from a top edge of said second end wall inwardly over a selected portion of said coalescing chamber at a selected obtuse angle, said inclined cover including a top surface and a bottom surface and an edge therebetween extending between said opposing sidewalls and defining a weir for separating a major amount of an oil and a minor amount of said oil water composite fluid from said oil water composite fluid when said coalescing chamber is filled to a selected level and the overflow of the oil water composite fluid spills over said edge and said top surface of said inclined cover defining a liquid conveyor;
   a mechanical oil separation chamber in fluid communication with said coalescing chamber is disposed between said opposing end walls and said coalescing chamber second end wall and a baffle end wall of a concentrate product chamber at a selected depth within said reservoir for accumulation of said major amount of oil and said minor amount of oil water composite fluid from said liquid conveyor;
   a rotating drum assembly including a frame supporting a rotating drum having a bottom portion in fluid communication with said major amount of oil and said minor amount of oil water composite fluid contained in said mechanical oil separation chamber rotating at a selected speed by a motor whereby a concentrate product comprising a majority of said oil removably adheres, absorbs, or adsorbs to a surface of said rotating drum;
   a wiper assembly comprising a blade extending across at least a portion of said rotating drum cooperatively engaging said surface of said rotating drum at a selected angle removing at least a portion of said concentrate product therefrom;
   said blade is in fluid communication with said concentrate product chamber disposed between said opposing side walls and a reservoir end wall and said rotating drum at a selected depth, said baffle end wall extending upward adjacent said rotating drum at a height above the level of the concentrate product and above the level of the major amount of oil and minor amount of oil water composite fluid, said concentrate product chamber including a discharge port for removal of said concentrate product;
   a purge oil chamber comprises an inner purge oil chamber baffle extends from said bottom panel of said coalescing chamber between said opposing side walls from a first end wall of said coalescing chamber inwardly and upward a selected distance above the level of the oil water composite fluid and an outer purge oil chamber baffle extending upward from said bottom panel of said tank and between said opposing side walls and spaced apart from said first end wall of said coalescing chamber and said first end wall of said tank a selected distance below the level of the oil water composite fluid; a clean solution chamber is disposed a selected distance above said tank floor panel and said oil purge chamber baffle extending vertically from a bottom of said clean solution chamber; and
   a clean solution chamber in fluid communication with said oil purge chamber is disposed between said opposing side walls above said tank floor adjacent said first tank wall and in fluid communication with an adjustable outlet pipe in fluid communication with a clean water discharge port.

11. The skimmer of claim 10, wherein at least one of said vertical side flanges includes at least one sight indicator pointing to a column of vertical indicia disposed on said bracket means for indicating the vertical adjustment of said pair of floats with respect to said weir plate.

12. The skimmer of claim 10, wherein each one of said pair of floats include a removable plug to adjust the depth.

13. The skimmer of claim 10, wherein said means for slidably securing a weir plate to an outer surface of said stationary receiver box comprises a single pin engaging said central vertical slot allowing said weir plate to pivot and minimize binding upon sliding engagement with said receiver box in accordance with movement of said pair of floats according to a level of said composite fluid.

\* \* \* \* \*